United States Patent
Gulati et al.

(10) Patent No.: US 11,385,323 B2
(45) Date of Patent: Jul. 12, 2022

(54) SELECTION OF FREQUENCY MODULATED CONTINUOUS WAVE (FMWC) WAVEFORM PARAMETERS FOR MULTI-RADAR COEXISTENCE

(71) Applicant: QUALCOMM Incorporated, San Diego, CA (US)

(72) Inventors: Kapil Gulati, Hillsborough, NJ (US); Junyi Li, Chester, NJ (US); Sundar Subramanian, San Diego, CA (US); Jayakrishnan Unnikrishnan, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 16/418,830

(22) Filed: May 21, 2019

(65) Prior Publication Data
US 2019/0391247 A1 Dec. 26, 2019

Related U.S. Application Data

(60) Provisional application No. 62/689,579, filed on Jun. 25, 2018.

(51) Int. Cl.
*G01S 13/34* (2006.01)
*H04J 13/00* (2011.01)
(Continued)

(52) U.S. Cl.
CPC ............ *G01S 7/0232* (2021.05); *G01S 7/023* (2013.01); *G01S 7/0234* (2021.05);
(Continued)

(58) Field of Classification Search
CPC .... G01S 13/284; G01S 13/341; G01S 13/343; G01S 13/931; G01S 7/023; H04J 13/0062
See application file for complete search history.

(56) References Cited

U.S. PATENT DOCUMENTS

| 6,321,602 B1 | 11/2001 | Ben-Romdhane |
| 6,707,419 B2 | 3/2004 | Woodington et al. |

(Continued)

FOREIGN PATENT DOCUMENTS

| EP | 2390679 A1 | 11/2011 |
| WO | WO-2017128275 A1 | 8/2017 |

OTHER PUBLICATIONS

International Search Report and Written Opinion—PCT/US2019/033556—ISA/EPO—dated Sep. 13, 2019.

*Primary Examiner* — Timothy X Pham
(74) *Attorney, Agent, or Firm* — Danai Nelisile Mhembere; Holland & Hart LLP

(57) ABSTRACT

Methods, systems, and devices for radar signaling s are described. In some systems, devices may select radar parameters (e.g., frequency modulated continuous wave waveform parameters) to support coexistence for multiple radar sources in the system. To reduce mutual interference between radar waveforms in a system, a user equipment may detect interference from at least one interference source (e.g., another device transmitting a radar waveform) and may select waveform parameters for transmission of a radar waveform based on the detected interference. For example, the user equipment may determine slopes, frequency offsets, codewords, or a combination thereof used by nearby devices in the system (e.g., per chirp or for a waveform) and may select waveform parameters that result in low mutual interference with the determined slopes, frequency offsets, codewords, or combination thereof. The user equipment may transmit the radar waveform according to the selected waveform parameters.

34 Claims, 11 Drawing Sheets

(51) Int. Cl.
  *G01S 13/28* (2006.01)
  *G01S 7/02* (2006.01)
(52) U.S. Cl.
  CPC .......... *G01S 13/284* (2013.01); *G01S 13/341* (2013.01); *G01S 13/343* (2013.01); *H04J 13/0062* (2013.01)

(56) References Cited

U.S. PATENT DOCUMENTS

| | | |
|---|---|---|
| 8,130,857 B2 | 3/2012 | Kim et al. |
| 8,351,455 B2 | 1/2013 | Tang et al. |
| 9,225,452 B2 | 12/2015 | Kim et al. |
| 9,841,498 B1 | 12/2017 | Campbell et al. |
| 10,048,353 B2 | 8/2018 | Vogt et al. |
| 10,082,562 B1 | 9/2018 | Abari et al. |
| 10,620,297 B2 | 4/2020 | Cohen et al. |
| 10,736,134 B2 | 8/2020 | Lee et al. |
| 10,855,328 B1 | 12/2020 | Gulati et al. |
| 11,073,598 B2 | 7/2021 | Gulati et al. |
| 2003/0210172 A1 | 11/2003 | Pleva et al. |
| 2006/0125682 A1* | 6/2006 | Kelly, Jr. ............. G01S 13/931 342/159 |
| 2006/0222098 A1 | 10/2006 | Sedarat et al. |
| 2008/0037669 A1* | 2/2008 | Pan ..................... H04B 7/0639 375/260 |
| 2008/0177886 A1 | 7/2008 | Singh et al. |
| 2008/0310354 A1 | 12/2008 | Hansen et al. |
| 2009/0285264 A1 | 11/2009 | Aldana et al. |
| 2010/0226343 A1 | 9/2010 | Hsu et al. |
| 2011/0122014 A1 | 5/2011 | Szajnowski |
| 2011/0170427 A1 | 7/2011 | Koivisto et al. |
| 2012/0200743 A1 | 8/2012 | Blanchflower et al. |
| 2016/0054441 A1 | 2/2016 | Kuo et al. |
| 2016/0124075 A1 | 5/2016 | Vogt et al. |
| 2016/0146933 A1 | 5/2016 | Rao et al. |
| 2016/0187462 A1 | 6/2016 | Altus et al. |
| 2016/0223643 A1 | 8/2016 | Li et al. |
| 2016/0327633 A1 | 11/2016 | Kumar et al. |
| 2017/0195033 A1 | 7/2017 | Zhang et al. |
| 2017/0219689 A1 | 8/2017 | Hung et al. |
| 2017/0363712 A1 | 12/2017 | Kim |
| 2017/0371028 A1 | 12/2017 | Laifenfeld et al. |
| 2018/0048493 A1 | 2/2018 | Bordes et al. |
| 2018/0059213 A1 | 3/2018 | Wallstedt et al. |
| 2018/0102877 A1 | 4/2018 | Jiang et al. |
| 2018/0145855 A1 | 5/2018 | Chaudhuri et al. |
| 2018/0199377 A1 | 7/2018 | Sanderovich et al. |
| 2018/0248596 A1 | 8/2018 | Xiao et al. |
| 2019/0056488 A1* | 2/2019 | Vacanti ................... G01S 7/003 |
| 2019/0086528 A1 | 3/2019 | Steiner |
| 2019/0219683 A1 | 7/2019 | Fang |
| 2019/0265346 A1 | 8/2019 | Hakobyan et al. |
| 2019/0293748 A1 | 9/2019 | Gulati et al. |
| 2019/0369204 A1* | 12/2019 | Kim ..................... H04B 17/336 |
| 2019/0383925 A1 | 12/2019 | Gulati et al. |
| 2020/0025866 A1 | 1/2020 | Gulati et al. |
| 2020/0028656 A1 | 1/2020 | Gulati et al. |
| 2020/0033442 A1 | 1/2020 | Gulati et al. |
| 2020/0132825 A1 | 4/2020 | Jungmaier et al. |
| 2020/0233076 A1 | 7/2020 | Chen et al. |
| 2020/0300996 A1 | 9/2020 | Cetinoneri et al. |
| 2020/0351883 A1 | 11/2020 | Wu et al. |
| 2021/0096234 A1 | 4/2021 | Gulati et al. |
| 2021/0195435 A1 | 6/2021 | Rimini et al. |

\* cited by examiner

SELECTION OF FREQUENCY MODULATED CONTINUOUS WAVE (FMWC) WAVEFORM PARAMETERS FOR MULTI-RADAR COEXISTENCE

CROSS REFERENCE

The present application for patent claims the benefit of U.S. Provisional Patent Application No. 62/689,579 by Gulati et al., entitled "Selection of FMCW Waveform Parameters for Multi-Radar Coexistence," filed Jun. 25, 2018, assigned to the assignee hereof, and expressly incorporated by reference in its entirety herein.

BACKGROUND

The following relates generally to enabling coexistence for multiple radar sources by a user equipment (UE).

Radar systems may be used for target detection by transmitting radio frequency waveforms and observing the reflected received waveform from the target to estimate the properties of the target. The properties of the target may include distance, speed, and angular location of the target. Radar systems may be widely used for detection of aircrafts, ships, vehicles, weather formations, terrains, and other objects. Examples of the transmitted radio frequency waveforms used in radar systems include frequency modulated continuous wave (FMCW), phase modulated continuous wave (PMCW), and other types of waveforms.

Radar may be used by automobiles as a sensor input which may enable advanced driver assistance systems (ADAS) and automated driving. Radar transmissions from nearby vehicles, however, may generate significant interference for the radar systems and, in some cases, may degrade the target detection performance.

SUMMARY

The present disclosure relates to methods, systems, devices, and apparatuses that support a user equipment (UE) having a radar, for example, integrated on a vehicle, that selects frequency modulated continuous wave (FMCW) waveform parameters that may enable coexistence of multiple radars by suppressing mutual interference in a system.

A method for radar signaling s implemented by a UE is described. The method may include detecting interference from at least one interference source, selecting waveform parameters for transmission of a radar waveform, where the radar waveform includes a set of chirps and the selecting includes varying the waveform parameters for at least one chirp of the set of chirps based on the detected interference, and transmitting the radar waveform according to the selected waveform parameters.

An apparatus for radar signaling s implemented by a UE is described. The apparatus may include a processor, memory coupled with the processor, and instructions stored in the memory. The instructions may be executable by the processor to cause the apparatus to detect interference from at least one interference source, select waveform parameters for transmission of a radar waveform, where the radar waveform includes a set of chirps and the selecting includes varying the waveform parameters for at least one chirp of the set of chirps based on the detected interference, and transmit the radar waveform according to the selected waveform parameters.

Another apparatus for radar signaling s implemented by a UE is described. The apparatus may include means for detecting interference from at least one interference source, selecting waveform parameters for transmission of a radar waveform, where the radar waveform includes a set of chirps and the selecting includes varying the waveform parameters for at least one chirp of the set of chirps based on the detected interference, and transmitting the radar waveform according to the selected waveform parameters.

A non-transitory computer-readable medium storing code for radar signaling s implemented by a UE is described. The code may include instructions executable by a processor to detect interference from at least one interference source, select waveform parameters for transmission of a radar waveform, where the radar waveform includes a set of chirps and the selecting includes varying the waveform parameters for at least one chirp of the set of chirps based on the detected interference, and transmit the radar waveform according to the selected waveform parameters.

In some aspects of the method, apparatuses, and non-transitory computer-readable medium described herein, the detected interference may include at least a second radar waveform and the method, apparatuses, and non-transitory computer-readable medium described herein may further include operations, features, means, or instructions for identifying at least one codeword corresponding to at least the second radar waveform of the detected interference, where the waveform parameters may be selected based on the identified at least one codeword.

Some aspects of the method, apparatuses, and non-transitory computer-readable medium described herein may further include operations, features, means, or instructions for selecting a codeword for the radar waveform different from the identified at least one codeword, where the waveform parameters may be based on the selected codeword for the radar waveform.

In some aspects of the method, apparatuses, and non-transitory computer-readable medium described herein, the selecting the codeword for the radar waveform may include operations, features, means, or instructions for determining a subset of a codebook based on the identified at least one codeword and selecting the codeword for the radar waveform from the subset of the codebook using a random selection process.

In some aspects of the method, apparatuses, and non-transitory computer-readable medium described herein, the selecting the codeword for the radar waveform may include operations, features, means, or instructions for determining second waveform parameters indicated by the identified at least one codeword and selecting the codeword for the radar waveform based on a mutual interference for the waveform parameters indicated by the codeword for the radar waveform and the second waveform parameters indicated by the identified at least one codeword being below a mutual interference threshold.

In some aspects of the method, apparatuses, and non-transitory computer-readable medium described herein, the detecting the interference may include operations, features, means, or instructions for periodically measuring interference on a channel and periodically selecting updated waveform parameters for transmission of the radar waveform based on the periodically measured interference.

In some aspects of the method, apparatuses, and non-transitory computer-readable medium described herein, the radar waveform includes an FMCW waveform. In some aspects of the method, apparatuses, and non-transitory computer-readable medium described herein, the selecting the waveform parameters may include operations, features, means, or instructions for selecting a slope and a frequency offset of the FMCW waveform corresponding to a Zadoff-Chu sequence.

Some aspects of the method, apparatuses, and non-transitory computer-readable medium described herein may further include operations, features, means, or instructions for applying a phase modulation to the radar waveform. In some aspects of the method, apparatuses, and non-transitory computer-readable medium described herein, the detected interference may include at least a second radar waveform and the applying the phase modulation may include operations, features, means, or instructions for selecting the phase modulation for the radar waveform such that the phase modulation may be different from a second phase modulation for at least the second radar waveform of the detected interference.

In some aspects of the method, apparatuses, and non-transitory computer-readable medium described herein, the detected interference may include at least a second radar waveform and the selecting the waveform parameters may include operations, features, means, or instructions for selecting a slope for the at least one chirp of the set of chirps such that the slope may be different from a second slope for at least the second radar waveform of the detected interference.

In some aspects of the method, apparatuses, and non-transitory computer-readable medium described herein, the detected interference may include at least a second radar waveform and the selecting the waveform parameters may include operations, features, means, or instructions for selecting a frequency offset for the at least one chirp of the set of chirps such that an interference peak of at least the second radar waveform of the detected interference appears beyond a range of interest.

BRIEF DESCRIPTION OF THE DRAWINGS

FIG. 7A illustrates unvaried waveform parameters, while FIG. 7B illustrates variations in the slope and/or the frequency offset parameters.

DETAILED DESCRIPTION

Figure 1:
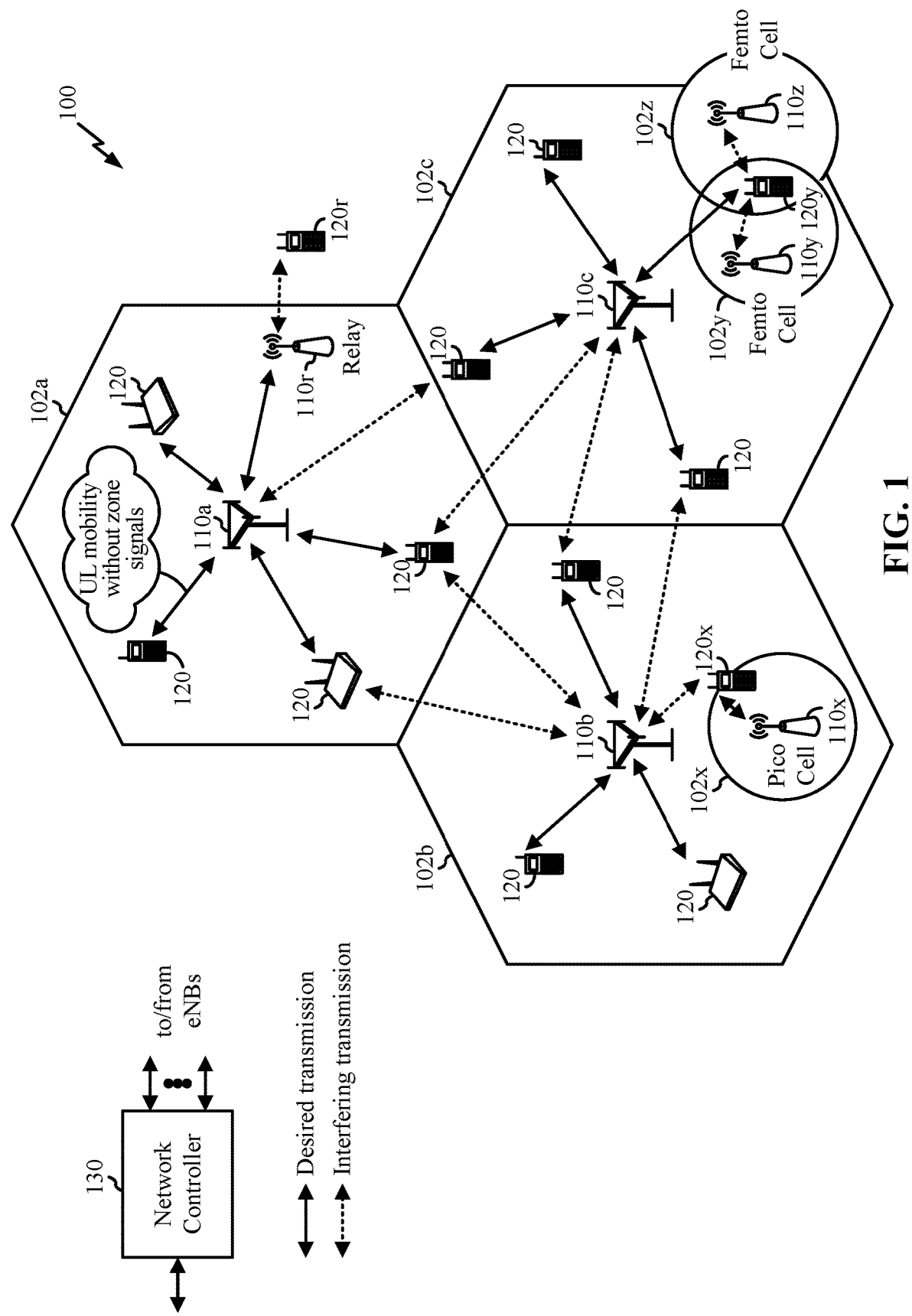
FIG. 1 illustrates an example wireless network in accordance with aspects of the present disclosure.

In some wireless communications systems, such as fifth generation (5G) New Radio (NR) systems, transmission waveforms may include cyclic prefix orthogonal frequency-division multiplexing (CP-OFDM) and DFT-Spread (DFT-S) OFDM. 5G allows for switching between both CP-OFDM and DFT-S-OFDM on the uplink (UL) to get the multiple input multiple output (MIMO) spatial multiplexing benefit of CP-OFDM and the link budget benefit of DFT-S OFDM. With Long-Term Evolution (LTE), orthogonal frequency-division multiple access (OFDMA) communication signals may be used for DL communications, while single-carrier frequency-division multiple access (SC-FDMA) communication signals may be used for LTE UL communications. The DFT-s-OFDMA scheme spreads a set of data symbols (i.e., a data symbol sequence) over a frequency domain which is different from the OFDMA scheme. Also, in comparison to the OFDMA scheme, the DFT-s-OFDMA scheme can greatly reduce a peak to average power ratio (PAPR) of a transmission signal. The DFT-s-OFDMA scheme may also be referred to as an SC-FDMA scheme.

Scalable OFDM multi-tone numerology is another feature of 5G. Prior versions of LTE supported a mostly fixed OFDM numerology of fifteen (15) kilohertz (kHz) spacing between OFDM tones (often called subcarriers) and carrier bandwidths up to twenty (20) megahertz (MHz). Scalable OFDM numerology has been introduced in 5G to support diverse spectrum bands/types and deployment models. For example, 5G NR may be able to operate in millimeter wave (mmW) bands that have wider channel widths (e.g., hundreds of MHz) than bands in use in LTE. Also, the OFDM subcarrier spacing may be able to scale with the channel width, so the fast-Fourier transform (FFT) size scales such that processing complexity does not increase unnecessarily for wider bandwidths. In the present application, numerology refers to the different values that different features (e.g., subcarrier spacing, cyclic prefix (CP), symbol length, FFT size, transmission time interval (TTI), etc.) of a communications system can take.

Also in 5G NR, cellular technologies have been expanded into the unlicensed spectrum (e.g., both stand-alone and licensed-assisted (LAA)). In addition, the unlicensed spectrum may occupy frequencies up to one hundred (100) gigahertz (GHz) or higher, also known as mmW. The use of unlicensed bands provides added capacity for communications in the system.

A first member of this technology family is referred to as LTE Unlicensed (LTE-U). By aggregating LTE in unlicensed spectrum with an 'anchor' channel in licensed spectrum, faster downloads are enabled for customers. Also, LTE-U may share the unlicensed spectrum fairly with Wi-Fi. This may be advantageous because in the five (5) GHz unlicensed band where Wi-Fi devices are in wide use, it is desirable for LTE-U to coexist with Wi-Fi. However, an LTE-U network may cause radio frequency (RF) interference to an existing co-channel Wi-Fi device. Choosing a preferred operating channel and minimizing the interference caused to nearby Wi-Fi networks may be a goal for LTE-U devices. However, an LTE-U single carrier (SC) device may operate on the same channel as Wi-Fi if all available channels are occupied by Wi-Fi devices. To coordinate spectrum access between LTE-U and Wi-Fi, the energy across the intended transmission band may first be detected. This energy detection (ED) mechanism informs the device of ongoing transmissions by other nodes. Based on this ED information, a device decides if it may transmit on the intended transmission band. Wi-Fi devices may not back off to LTE-U transmissions unless the interference level caused by the LTE-U transmissions is above an ED threshold (e.g., negative sixty-two (−62) decibel-milliwatts (dBm) over 20 MHz). Thus, without proper coexistence mechanisms in place, LTE-U transmissions could cause considerable interference on a Wi-Fi network relative to Wi-Fi transmissions.

LAA is another member of the unlicensed technology family. Like LTE-U, it may also use an anchor channel in licensed spectrum. However, it also adds "listen before talk" (LBT) operations to the LTE functionality.

A gating interval may be used to gain access to a channel of a shared spectrum. The gating interval may determine the application of a contention-based protocol such as an LBT protocol. The gating interval may indicate when a clear channel assessment (CCA) is performed. Whether a channel of the shared unlicensed spectrum is available or in use is determined by the CCA. If the channel is "clear" for use, i.e., available, the gating interval may allow the transmitting apparatus to use the channel. Access to the channel is typically granted for a predefined transmission interval. Thus, with unlicensed spectrum, an LBT procedure is performed before transmitting a message. If the channel is not cleared for use, then a device will not transmit on the channel.

Another member of this family of unlicensed technologies is LTE wireless local area network (WLAN) Aggregation (LWA), which may utilize both LTE and Wi-Fi. Accounting for both channel conditions, LWA can split a single data flow into two data flows which allows both the LTE and the Wi-Fi channel to be used for an application. Instead of competing with Wi-Fi, the LTE signal may use the WLAN connections seamlessly to increase capacity.

The final member of this family of unlicensed technologies is MulteFire. MulteFire opens up new opportunities by operating Fourth Generation (4G) LTE technology solely in unlicensed spectrum such as the global 5 GHz. Unlike LTE-U and LAA, MulteFire may support entities without any access to the licensed spectrum. Thus, it operates in unlicensed spectrum on a standalone basis (e.g., without any anchor channel in the licensed spectrum). Thus, MulteFire differs from LTE-U, LAA, and LWA because LTE-U, LAA, and LWA aggregate unlicensed spectrum with an anchor in licensed spectrum. Without relying on licensed spectrum as the anchoring service. MulteFire allows for Wi-Fi-like deployments. A MulteFire network may include access points (APs) and/or base stations communicating in an unlicensed radio frequency spectrum band (e.g., without a licensed anchor carrier).

Discovery reference signal (DRS) measurement timing configuration (DMTC) is a technique that allows MulteFire to transmit with minimal or reduced interference to other unlicensed technologies, including Wi-Fi. Additionally, the periodicity of discovery signals in MulteFire may be very sparse. This allows MulteFire to access channels occasionally, transmit discovery and control signals, and then vacate the channels. Since the unlicensed spectrum is shared with other radios of similar or dissimilar wireless technologies, a so-called LBT method may be applied for channel sensing. LBT may include sensing the medium for a pre-defined minimum amount of time and backing off if the channel is busy. Therefore, the initial random access (RA) procedure for standalone LTE-U may involve a minimal number of transmissions with low latency, such that the number of LBT operations may be minimized or reduced and the RA procedure may be completed quickly.

Leveraging a DMTC window, MulteFire algorithms may search for and decode reference signals in unlicensed bands from neighboring base stations in order to find which base station to select to serve the user. As the caller moves past one base station, their user equipment (UE) may send a measurement report to the base station, triggering a handover procedure and transferring the caller (and all of their content and information) to the next base station.

Since LTE traditionally operates in licensed spectrum and Wi-Fi operated in unlicensed bands, coexistence with Wi-Fi or other unlicensed technology was not considered when LTE was designed. In moving to the unlicensed world, the LTE waveform may be modified and algorithms may be added in order to perform LBT. This may support the ability to share a channel with unlicensed incumbents, including Wi-Fi, by not immediately acquiring the channel and transmitting. The present example supports LBT and the detection and transmission of Wi-Fi Channel Usage Beacon Signals (WCUBSs) for ensuring coexistence with Wi-Fi neighbors.

MulteFire was designed to "hear" a neighboring Wi-Fi base station's transmission. MulteFire may listen first and autonomously make the decision to transmit when there is no other neighboring Wi-Fi transmitting on the same channel (e.g., within a threshold range). This technique may ensure co-existence between MulteFire and Wi-Fi operations.

The Third Generation Partnership Project (3GPP) and the European Telecommunications Standards Institute (ETSI) mandate an LBT detection threshold (e.g., a negative seventy-two (−72) dBm LBT detection threshold). This threshold may further help wireless devices avoid transmitting messages that interfere with Wi-Fi. MulteFire's LBT design may be similar or identical to the standards defined in 3GPP for LAA/enhanced LAA (eLAA) and may comply with ETSI rules.

An expanded functionality for 5G involves the use of 5G NR spectrum sharing (NR-SS). 5G NR-SS may enable enhancement, expansion, and/or upgrade of the spectrum sharing technologies introduced in LTE. These include LTE Wi-Fi Aggregation (LWA), LAA, eLAA, Citizens Broadcast Radio service (CBRS)/License Shared Access (LSA), or any combination of these technologies.

Some systems (e.g., LTE systems, 5G systems, etc.) may implement frequency modulated continuous wave (FMCW) waveforms for radar signaling. Certain waveform parameters for the FMCW waveforms may support multi-radar coexistence in systems with many UEs in close proximity. For example, UEs may select patterns of FMCW waveform parameters from a codebook. Specific combinations of FMCW waveform parameters (e.g., specific combinations of codewords from the codebook) may result in low mutual interference between UEs (e.g., below some mutual interference threshold). To select waveform parameters that mitigate interference in the system, a UE may determine radar waveforms used by nearby radar sources in the system. For example, the UE may detect interference from at least one interference source (e.g., another UE transmitting a radar waveform), select waveform parameters for transmission based on the detected interference, and transmit a radar waveform according to the selected parameters. The waveform parameters may include a slope and/or a frequency offset per chirp of an FMCW radar waveform. In some cases, the UE may determine the slope, the frequency offset, the codeword, or a combination thereof implemented by the interference source's waveform, and the UE may select its own slope, frequency offset, codeword, or combination thereof to limit interference between the radar waveforms of the UE and the interference source.

Aspects of the disclosure are initially described in the context of a wireless communications system. Aspects of the disclosure are then illustrated by and described with reference to apparatus diagrams, system diagrams, and flowcharts that relate to selecting FMCW waveform parameters for multi-radar coexistence.

FIG. 1 illustrates an example wireless network 100 (e.g., an NR network, or 5G network, or any other type of wireless communications network or system) in accordance with aspects of the present disclosure.

As illustrated in FIG. 1, the wireless network 100 may include a number of base stations 110 and other network entities. A base station 110 may be a station that communicates with UEs 120. Each base station 110 may provide communication coverage for a particular geographic area. In 3GPP, the term "cell" may refer to a coverage area of a Node B and/or a Node B subsystem serving this coverage area, depending on the context in which the term is used. In NR systems, the term "cell" and evolved Node B (eNB), Node B, 5G NB, AP, NR base station, 5G Radio NodeB (gNB), or transmission/reception point (TRP) may be interchangeable. In some aspects, a cell may not necessarily be stationary, and the geographic area of the cell may move according to the location of a mobile base station. In some aspects, the base stations 110 may be interconnected to one another and/or to one or more other base stations 110 or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A base station 110 may provide communication coverage for a macro cell, a pico cell, a femto cell, and/or other types of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs in a Closed Subscriber Group (CSG), UEs for users in the home, etc.). A base station 110 for a macro cell may be referred to as a macro base station. A base station for a pico cell may be referred to as a pico base station. A base station for a femto cell may be referred to as a femto base station or a home base station. In the example shown in FIG. 1, the base stations 110a, 110b, and 110c may be macro base stations for the macro cells 102a, 102b and 102c, respectively. The base station 110x may be a pico base station for a pico cell 102x. The base stations 110y and 110z may be femto base station for the femto cells 102y and 102z, respectively. A base station may support one or multiple (e.g., three) cells.

The wireless network 100 may also include relay stations. A relay station is a station that receives a transmission of data and/or other information from an upstream station (e.g., a base station 110 or a UE 120) and sends a transmission of the data and/or other information to a downstream station (e.g., a UE 120 or a base station 110). A relay station may also be a UE 120 that relays transmissions for other UEs 120. In the example shown in FIG. 1, a relay station 110r may communicate with the base station 110a and a UE 120r in order to facilitate communication between the base station 110a and the UE 120r. A relay station may also be referred to as a relay base station, a relay, etc.

The wireless network 100 may be a heterogeneous network that includes base stations 110 of different types, e.g., macro base stations, pico base stations, femto base stations, relays, etc. These different types of base stations may have different transmit power levels, different coverage areas, and may have differing impacts on interference in the wireless network 100. For example, a macro base station may have a high transmit power level (e.g., 20 Watts) whereas a pico base station, a femto base station, and/or a relay may have a lower transmit power level (e.g., one (1) Watt).

The wireless network 100 may support synchronous or asynchronous operation. For synchronous operation, the base stations 110 may have similar frame timing, and transmissions from different base stations 110 may be approximately aligned in time. For asynchronous operation, the base stations 110 may have different frame timing, and transmissions from different base stations 110 may not be aligned in time. The techniques described herein may be used for both synchronous and asynchronous operation.

A network controller 130 may be coupled to a set of base stations 110 and provide coordination and control for these base stations 110. The network controller 130 may communicate with the base stations 110 via a backhaul. The base stations 110 may also communicate with one another, e.g., directly or indirectly via wireless or wireline backhaul.

The UEs 120 (e.g., UEs 120x, 120y, etc.) may be dispersed throughout the wireless network 100, and each UE 120 may be stationary or mobile. A UE 120 may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality (VR) goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., global positioning system (GPS), Beidou, terrestrial, etc.), or any other suitable device that is configured to communicate via a wireless or wired medium.

Some UEs 120 may be considered machine-type communication (MTC) devices or evolved MTC (eMTC) devices, which may include remote devices that may communicate with a base station 110, another remote device, or some other entity. MTC may refer to communication involving at least one remote device on at least one end of the communication and may include forms of data communication which involve one or more entities that may not involve human interaction. MTC UEs may include UEs 120 that are capable of MTC communications with MTC servers and/or other MTC devices through Public Land Mobile Networks (PLMNs), for example. MTC and enhanced MTC (eMTC) UEs include, for example, robots, drones, remote devices, sensors, meters, monitors, cameras, location tags, etc., that may communicate with a base station 110, another device (e.g., remote device), or some other entity. A wireless node may provide, for example, connectivity for or to a network (e.g., a wide area network such as Internet or a cellular network) via a wired or wireless communication link. MTC UEs, as well as other UEs 120, may be implemented as Internet-of-Things (IoT) devices, e.g., narrowband IoT (NB-IoT) devices. In NB IoT, the UL and DL have higher periodicities and repetition interval values as a UE 120 decodes data in extended coverage.

In FIG. 1, a solid line with double arrows indicates desired transmissions between a UE 120 and a serving base station, which is a base station 110 designated to serve the UE 120 on the DL and/or UL. A dashed line with double arrows indicates interfering transmissions between a UE 120 and a base station 110.

Certain wireless networks (e.g., LTE) utilize OFDM on the DL and single-carrier frequency division multiplexing (SC-FDM) on the UL. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers, K, may be dependent on the system bandwidth. For example, the spacing of the subcarriers may be 15 kHz and the minimum resource allocation (e.g., a resource block (RB)) may be twelve (12) subcarriers (or one hundred eighty (180) kHz). Consequently, the nominal FFT size may be equal to one hundred and twenty-eight (128), two hundred and fifty-six (256), five hundred and twelve (512), one thousand twenty-four (1024) or two thousand forty-eight (2048) for system bandwidth of 1.25, 2.5, 5, 10 or 20 MHz, respectively. The system bandwidth may also be partitioned into subbands. For example, a subband may cover 1.08 MHz (e.g., six (6) RBs), and there may be 1, two (2), four (4), eight (8) or sixteen (16) subbands for system bandwidth of 1.25, 2.5, 5, 10 or 20 MHz, respectively.

While aspects described herein may be associated with LTE technologies, aspects of the present disclosure may be applicable with other wireless communications systems, such as NR or other wireless communications systems. NR may utilize OFDM with a CP on the UL and DL and may include support for half-duplex operation using time division duplex (TDD). A single component carrier (CC) bandwidth of 100 MHz may be supported. NR RBs may span 12 sub-carriers with a sub-carrier bandwidth of seventy-five (75) kHz over a 0.1 millisecond (ms) duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes (e.g., for NR) may be described in more detail herein with respect to FIGS. 6A, 6B, 7A, and 7B. Beamforming may be supported, and beam direction may be dynamically configured. MIMO transmissions with precoding may also be supported. MIMO configurations in the DL may support up to 8 transmit antennas with multi-layer DL transmissions up to 8 streams and up to 2 streams per UE 120. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units (CUs) and/or distributed units (DUs).

In some aspects, access to the air interface may be scheduled, where a scheduling entity (e.g., a base station 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations 110 are not the sole entities that may function as scheduling entities. That is, in some aspects, a UE 120 may function as a scheduling entity, scheduling resources for one or more subordinate entities (e.g., one or more other UEs 120). In this aspect, a first UE 120 is functioning as a scheduling entity, and other UEs utilize resources scheduled by the first UE 120 for wireless communication. A UE 120 may function as a scheduling entity in a peer-to-peer (P2P) network and/or in a mesh network. In a mesh network example, UEs 120 may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As discussed herein, a radio access network (RAN) may include a CU and one or more DUs. An NR base station (e.g., eNB, 5G Node B, Node B, TRP, AP, or gNB) may correspond to one or multiple base stations 110. NR cells may be configured as access cell (ACells) or data only cells (DCells). For example, the RAN (e.g., a CU or a DU) may configure the cells. DCells may be cells used for carrier aggregation (CA) or dual connectivity, but not used for initial access, cell selection/reselection, or handover. In some cases DCells may not transmit synchronization signals (SS), and in other cases DCells may transmit SS. NR base stations may transmit DL signals to UEs 120 indicating the cell type. Based on the cell type indication, the UE 120 may communicate with the NR base station. For example, the UE 120 may determine NR base stations to consider for cell selection, access, handover, and/or measurement based on the indicated cell type.

In some cases, the UEs 120 may be examples of vehicles operating within the wireless network 100. In these cases, the UEs 120 may detect other UEs 120 and communicate with the other UEs 120 directly (e.g., with no or minimal communication with base stations 110). In some cases, a UE 120 may transmit a radar waveform to detect nearby UEs 120. However, if these other UEs 120 also transmit radar waveforms to detect target devices, the multiple radar sources may result in interference and poor detection performance. To mitigate such issues, each UE 120 may transmit indications of the waveform parameters used by that UE 120, such that the nearby UEs 120 can identify the other radar waveforms and reduce the interference caused by these radar waveforms. Additionally or alternatively, a UE 120 may detect interference and determine waveform parameters and/or a codeword corresponding to the detected interference (e.g., if the interference corresponds to a radar waveform, such as an FMCW waveform). Based on the identified parameters for radar waveforms transmitted in close proximity to a UE 120 (e.g., within a certain geographic range, with received signal powers above a certain threshold, etc.), the UE 120 may select its own radar waveform parameters to reduce mutual interference with the detected radar waveforms.

Figure 2:
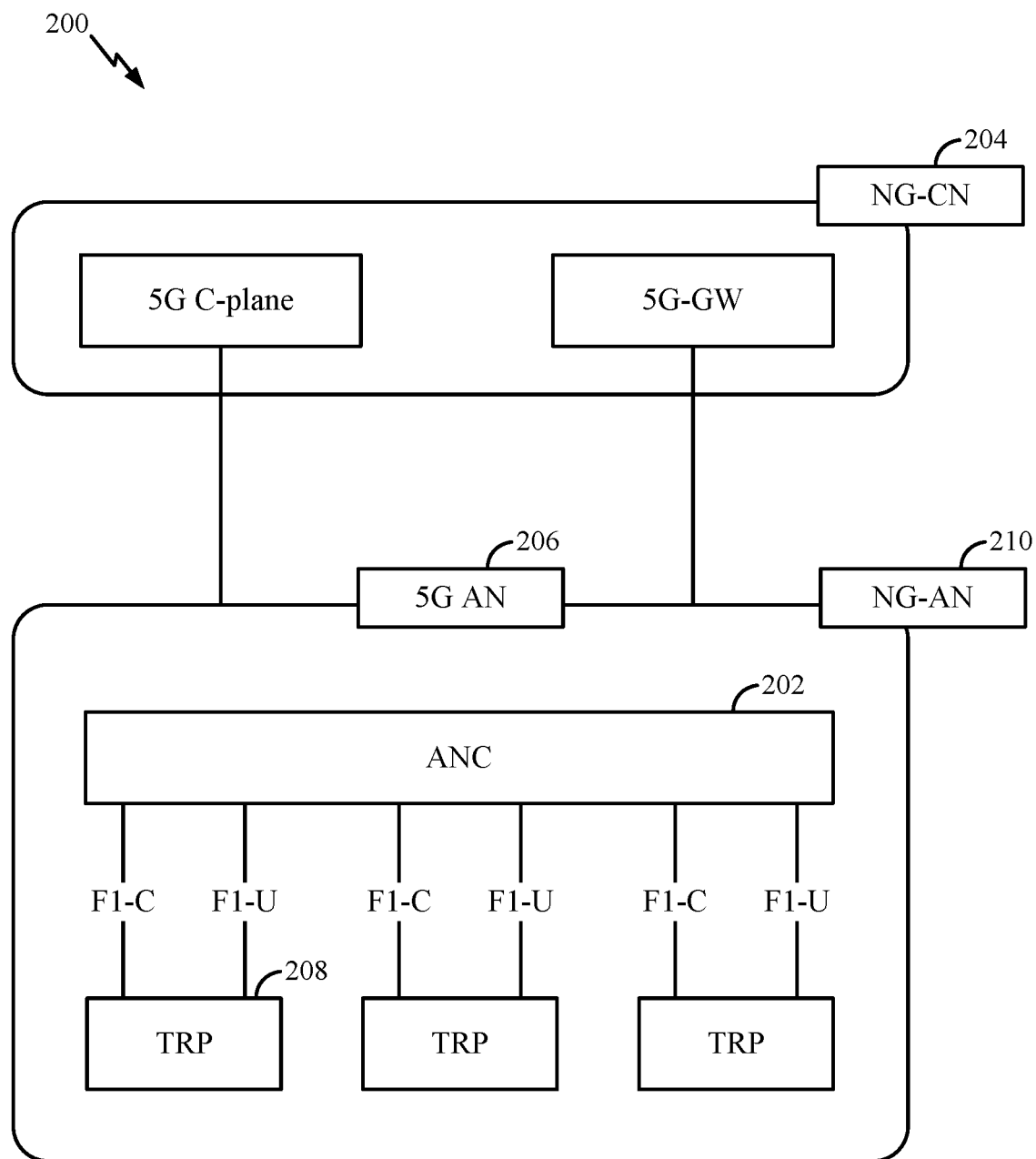
FIG. 2 illustrates an example logical architecture of a distributed radio access network (RAN) in accordance with aspects of the present disclosure.

FIG. 2 illustrates an example logical architecture of a distributed RAN 200, in accordance with aspects of the present disclosure. The distributed RAN 200 may be implemented in the wireless communications system illustrated in FIG. 1. A 5G access node 206 may include an access node controller (ANC) 202. The ANC 202 may be a CU of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208 (which may also be referred to as base stations, NR base stations, Node Bs, 5G NBs, APs, eNBs, gNBs, or some other term). As described herein, a TRP 208 may be used interchangeably with "cell."

The TRPs 208 may be examples of DUs. The TRPs 208 may be connected to one ANC (e.g., ANC 202) or more than one ANC. For example, for RAN sharing, radio as a service (RaaS), and service specific ANC deployments, the TRP 208 may be connected to more than one ANC 202. A TRP 208 may include one or more antenna ports. The TRPs 208 may be configured to individually (e.g., in dynamic selection) or jointly (e.g., in joint transmission) serve traffic to a UE.

The local architecture may be used to illustrate fronthaul definition. The architecture may be defined such that it may support fronthauling solutions across different deployment types. For example, the architecture may be based on transmit network capabilities (e.g., bandwidth, latency, and/or jitter).

The architecture may share features and/or components with LTE. According to aspects, the NG-AN 210 may support dual connectivity with NR. The NG-AN 210 may share a common fronthaul for LTE and NR.

The architecture may enable cooperation between and among TRPs 208. For example, cooperation may be preset within a TRP 208 and/or across TRPs 208 via the ANC 202. According to aspects, no inter-TRP interface may be needed/present.

According to aspects, a dynamic configuration of split logical functions may be present within the architecture. The Radio Resource Control (RRC) layer, Packet Data Convergence Protocol (PDCP) layer, Radio Link Control (RLC) layer, Medium Access Control (MAC) layer, and Physical (PHY) layer may be adaptably placed at the DU or CU (e.g., TRP 208 or ANC 202, respectively). According to certain aspects, a base station may include a CU (e.g., ANC 202) and/or one or more distributed units (e.g., one or more TRPs 208). In some cases, the distributed RAN 200 may support systems containing multi-radar coexistence. In these cases, the distributed RAN 200 may support the use of multi-radar coexistence using phase-coded FMCW waveforms. The exchange of radar information may allow for devices to select radar waveforms based on the radar information for other devices, allowing for improved multi-radar coexistence between the devices.

Figure 3:
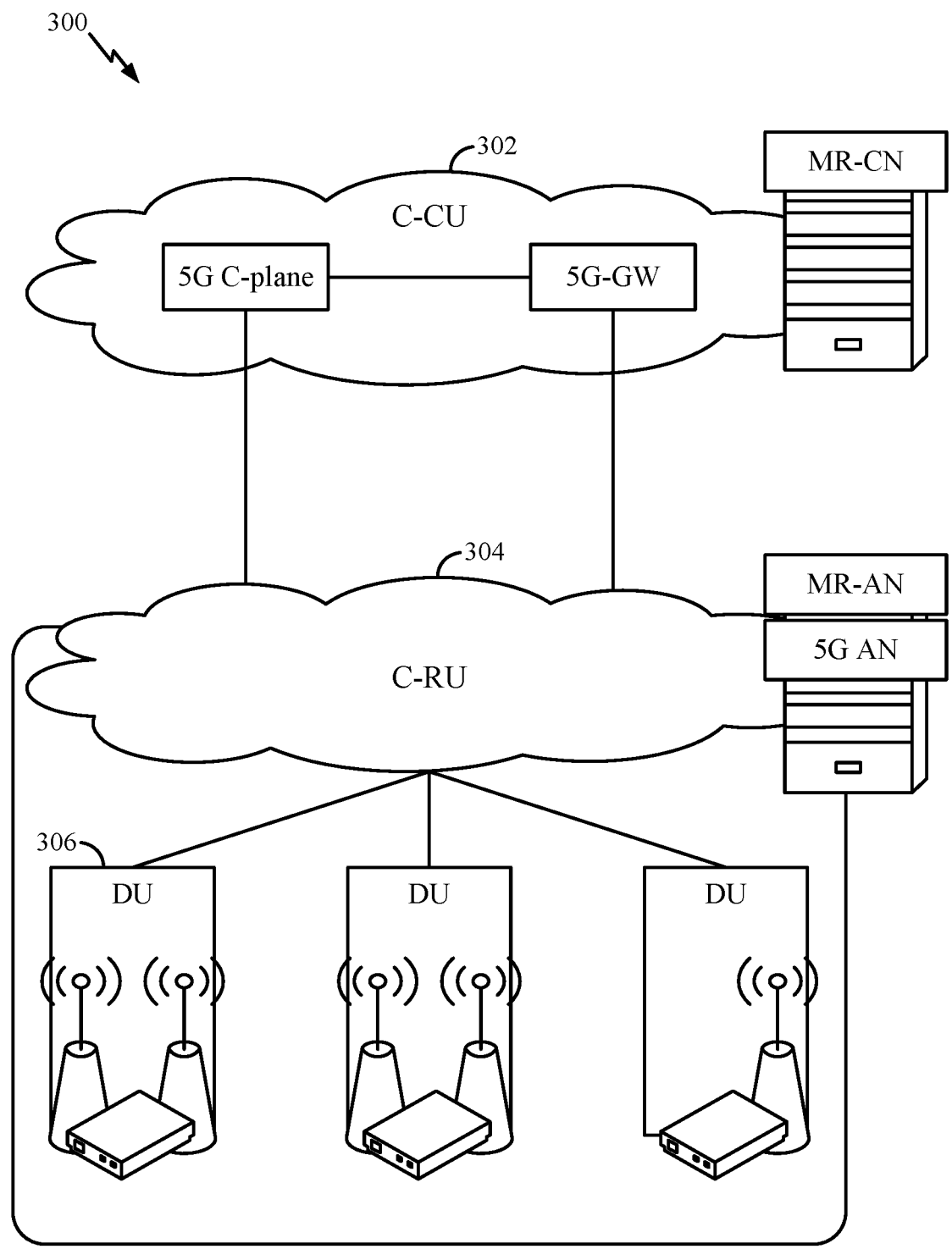
FIG. 3 illustrates an example physical architecture of a distributed RAN in accordance with aspects of the present disclosure.

FIG. 3 illustrates an example physical architecture of a distributed RAN 300, in accordance with aspects of the present disclosure. A centralized core network unit (C-CU) 302 may host core network functions. The C-CU 302 may be centrally deployed. C-CU 302 functionality may be off-loaded (e.g., to advanced wireless services (AWSs)) in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be closer to the network edge. A DU 306 may host one or more TRPs (e.g., edge nodes (ENs), edge units (EUs), radio heads (RHs), smart radio heads (SRHs), or the like). The DU 306 may be located at edges of the network with RF functionality. In some cases, the distributed RAN 300 may support multi-radar coexistence using FMCW waveforms (e.g., FMCW waveforms with waveform parameters varying per chirp, phase-coded FMCW waveforms, etc.). In some cases, the distributed RAN 300 may allow for centralized operation, where a DU 306 may transmit radar information to vehicles covered by the DU 306.

Figure 4:
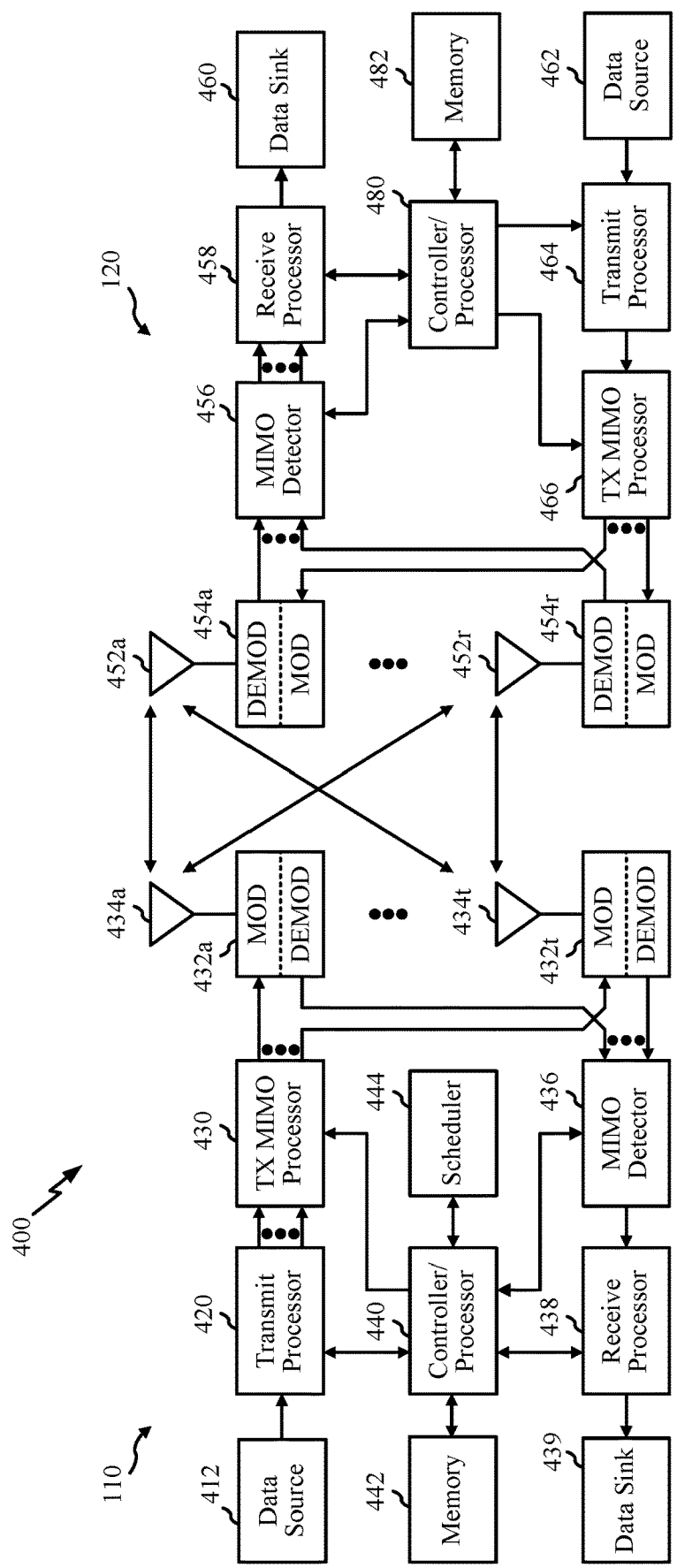
FIG. 4 illustrates example components of a base station and a user equipment (UE) in a wireless communications system in accordance with aspects of the present disclosure.

FIG. 4 illustrates example components of a base station 110 and a UE 120 (e.g., as illustrated in FIG. 1) in a wireless communications system 400 in accordance with aspects of the present disclosure. As described herein, the base station 110 may include one or more TRPs. One or more components of the base station 110 and UE 120 may be used to practice aspects of the present disclosure. For example, antennas 452, processors 466, 458, 464, and/or controller/processor 480 of the UE 120 and/or antennas 434, processors 430, 420, 438, and/or controller/processor 440 of the base station 110 may be used to perform the operations described herein.

FIG. 4 shows a block diagram of a design of a base station 110 and a UE 120, which may be one of the base stations and one of the UEs described with reference to FIG. 1. For a restricted association scenario, the base station 110 may be the macro base station 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid Automatic repeat request (HARQ) Indicator Channel (PHICH), Physical Downlink Control Channel (PDCCH), etc. The data may be for the Physical Downlink Shared Channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), cell-specific reference signal, etc. A transmit (TX) MIMO processor 430 may perform spatial processing (e.g., precoding) on the data symbols, the control symbols, and/or the reference symbols, if applicable, and may provide output symbol streams to the modulators 432a through 432t. For example, the TX MIMO processor 430 may perform certain aspects described herein for reference signal (RS) multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a DL signal. DL signals from modulators 432a through 432t may be transmitted via the antennas 434a through 434t, respectively.

At the UE 120, the antennas 452a through 452r may receive the DL signals from the base station 110 and may provide received signals to the demodulators 454a through 454r, respectively. Each demodulator 454 may condition (e.g., filter, amplify, down convert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, coordinated multi-point (CoMP) aspects can include providing the antennas, as well as some Tx/receive (Rx) functionalities, such that they reside in DUs. For example, some Tx/Rx processing may be done in the CU, while other processing can be done at the DUs. In accordance with one or more aspects as shown in the diagram, the base station modulator/demodulator 432 may be in the DUs.

On the UL, at the UE 120, a transmit processor 464 may receive and process data (e.g., for the Physical Uplink Shared Channel (PUSCH)) from a data source 462 and control information (e.g., for the Physical Uplink Control Channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the UL signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the base station 110 and the UE 120, respectively. A scheduler 444 may schedule UEs for data transmission on the DL and/or UL.

In some cases, rather than communicate with a base station 110, a UE 120 may communicate with another UE 120. For example, in a vehicle-to-everything (V2X) system, a vehicle may communicate directly with another vehicle (e.g., using sidelink communications). Additionally or alternatively, in a device-to-device (D2D) system, a UE 120 may communicate directly with another UE 120. To detect other UEs 120 in the system, a UE 120 may implement radar signaling. In some aspects, the UE 120 may transmit an FMCW waveform using an antenna 452 and may monitor for a reflection of the FMCW waveform. The FMCW parameters may support target detection in the presence of interfering radar sources (e.g., other UEs 120 transmitting similar radar signals). For example, the UE 120 may detect radar signals from interference sources and may select the FMCW parameters based on the detected radar signals.

Figure 5A:
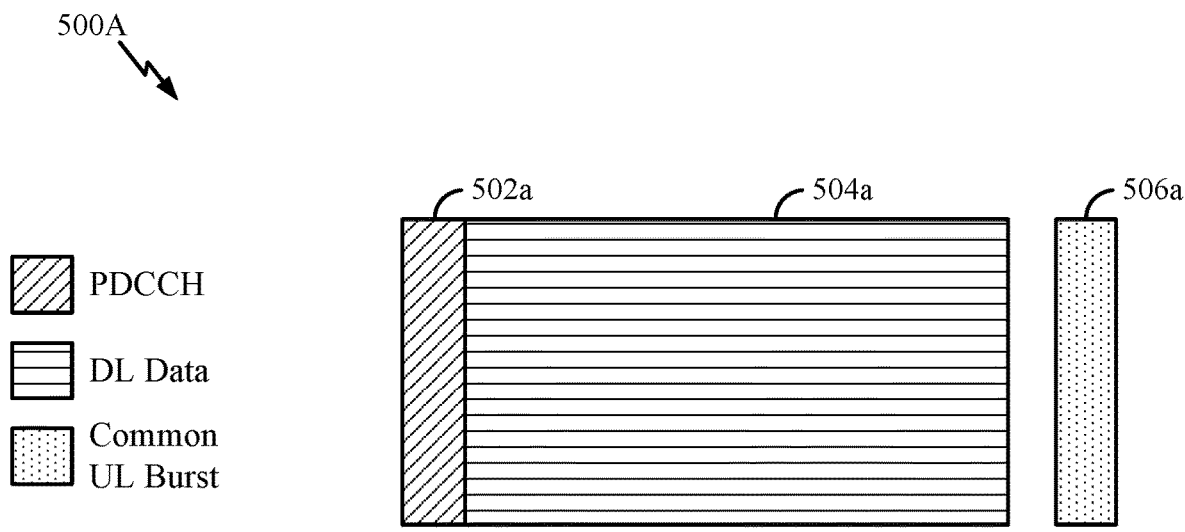
FIG. 5A illustrates an example of a downlink (DL)-centric subframe in accordance with aspects of the present disclosure.

FIG. 5A illustrates an example of a DL-centric subframe 500A in accordance with aspects of the present disclosure. The DL-centric subframe 500A may include a control portion 502a. The control portion 502a may exist in the initial or beginning portion of the DL-centric subframe 500A. The control portion 502a may include various scheduling information and/or control information corresponding to various portions of the DL-centric subframe 500A. In some configurations, the control portion 502a may be a PDCCH, as indicated in FIG. 5A.

The DL-centric subframe 500A may also include a DL data portion 504a. The DL data portion 504a may sometimes be referred to as the payload of the DL-centric subframe 500A. The DL data portion 504a may include the communication resources utilized to communicate DL data from the scheduling entity 202 (e.g., an eNB, base station, Node B, 5G NB, TRP, gNB, etc.) to a subordinate entity (e.g., a UE 120). In some configurations, the DL data portion 504a may be a PDSCH.

The DL-centric subframe 500A may also include a common UL portion 506a. The common UL portion 506a may sometimes be referred to as an UL burst, a common UL burst, and/or various other suitable terms. The common UL portion 506a may include feedback information corresponding to various other portions of the DL-centric subframe 500A. For example, the common UL portion 506a may include feedback information corresponding to the control portion 502a. Non-limiting examples of feedback information may include an acknowledgment (ACK) signal, a negative acknowledgment (NACK) signal, a HARQ indicator, and/or various other types of information. The common UL portion 506a may include additional or alternative information, such as information pertaining to random access channel (RACH) procedures, scheduling requests (SRs), sounding reference signals (SRSs), and various other suitable types of information.

As illustrated in FIG. 5A, the end of the DL data portion 504a may be separated in time from the beginning of the common UL portion 506a. This time separation may sometimes be referred to as a gap, a guard period (GP), a guard interval, and/or various other suitable terms. This separation provides time for the switchover from DL communication (e.g., reception operation by the subordinate entity, e.g., UE 120) to UL communication (e.g., transmission by the subordinate entity e.g., UE 120). One of ordinary skill in the art will understand, however, that the foregoing is merely one aspect of a DL-centric subframe 500A and alternative structures having similar features may exist without necessarily deviating from the aspects described herein.

Figure 5B:
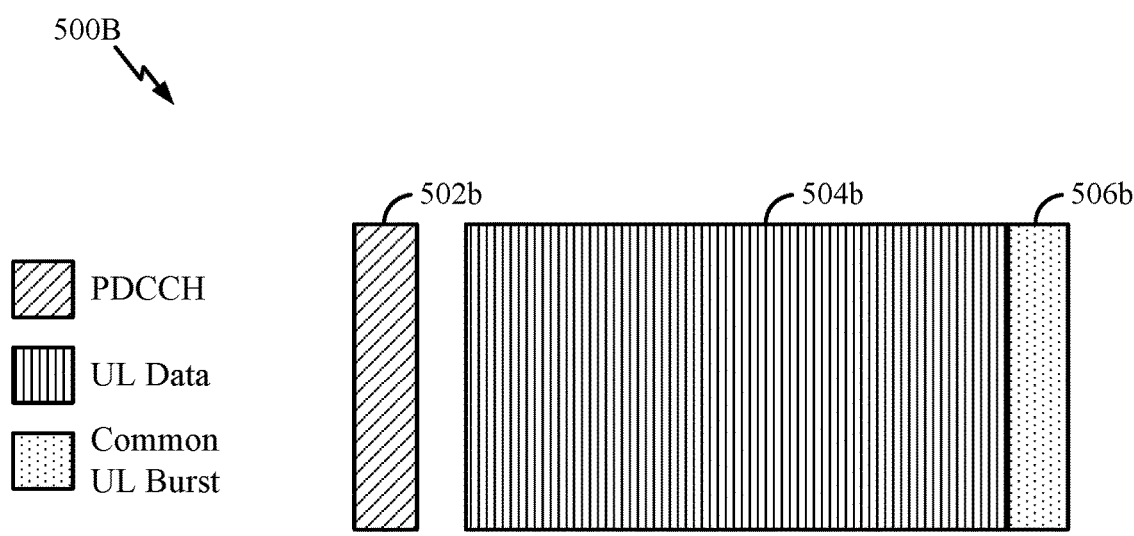
FIG. 5B illustrates an example of an uplink (UL)-centric subframe in accordance with aspects of the present disclosure.

FIG. 5B illustrates an example of an UL-centric subframe 500B in accordance with aspects of the present disclosure. The UL-centric subframe 500B may include a control portion 502b. The control portion 502b may exist in the initial or beginning portion of the UL-centric subframe 500B. The control portion 502b in FIG. 5B may be similar to the control portion 502a described herein with reference to FIG. 5A. The UL-centric subframe 500B may also include an UL data portion 504*b*. The UL data portion 504*b* may sometimes be referred to as the payload of the UL-centric subframe 500B. The UL portion may refer to the communication resources utilized to communicate UL data from the subordinate entity (e.g., a UE 120) to the scheduling entity 202 (e.g., a base station 110). In some configurations, the control portion 502*b* may be a PUSCH. As illustrated in FIG. 5B, the end of the control portion 502*b* may be separated in time from the beginning of the UL data portion 504*b*. This time separation may sometimes be referred to as a gap, GP, guard interval, and/or various other suitable terms. This separation provides time for the switchover from DL communication (e.g., reception operation by the scheduling entity 202) to UL communication (e.g., transmission by the scheduling entity 202).

The UL-centric subframe 500B may also include a common UL portion 506*b*. The common UL portion 506*b* in FIG. 5B may be similar to the common UL portion 506*a* described herein with reference to FIG. 5A. The common UL portion 506*b* may additionally or alternatively include information pertaining to channel quality indicators (CQIs), SRSs, and various other types of information. One of ordinary skill in the art will understand that the foregoing is merely one aspect of an UL-centric subframe 500B and alternative structures having similar features may exist without necessarily deviating from the aspects described herein.

As described herein, an UL-centric subframe 500B may be used for transmitting UL data from one or more mobile stations to a base station, and a DL centric subframe may be used for transmitting DL data from the base station to the one or more mobile stations. In one aspect, a frame may include both UL-centric subframes 500B and DL-centric subframes 500A. In this aspect, the ratio of UL-centric subframes 500B to DL-centric subframes 500A in a frame may be dynamically adjusted based on the amount of UL data and the amount of DL data to be transmitted. For example, if there is more UL data, then the ratio of UL-centric subframes 500B to DL-centric subframes 500A may be increased. Conversely, if there is more DL data, then the ratio of UL-centric subframes 500A to DL-centric subframes 500B may be decreased.

In some cases, UEs 120 may transmit radar signaling for target detection. This radar signaling may be transmitted according to transmission scheduling similar to the DL-centric subframe 500A of FIG. 5A, the UL-centric subframe 500B of FIG. 5B, or some other type of scheduling. The UE 120 may additionally monitor for and receive radar signaling (e.g., reflected signals from a target, radar interference from an interfering source, etc.). This reception may be performed according to scheduling similar to the DL-centric subframe 500A of FIG. 5A, the UL-centric subframe 500B of FIG. 5B, or some other type of scheduling.

In some wireless communications systems, multiple radar sources may lead to significant interference. Some radar waveforms, such as FMCW waveforms, may not natively support multiple access and thereby may be indistinguishable from various sources (e.g., automobiles). Thus, with multiple radar sources, it can be difficult to determine whether a detected waveform is a reflection from a detected target or interference from another radar source. For example, FMCW automotive radars may obtain range and velocity information from the beat frequency, which is composed of propagation delay and Doppler frequency. A Doppler frequency shift, $$f_D = \frac{2v}{\lambda},$$

is introduced by a target which moves with velocity v and with a radar wavelength $\lambda$. In the multi-radar coexistence scenario, the transmissions from other radar sources (e.g., automobiles) may appear as a ghost target which may be particularly bothersome since it may appear in the same angular direction as the desired reflected signal from that object (e.g., an automobile) and may not be readily identifiable as a ghost or normal (desired) target. Furthermore, the direct signal from the radar source may be significantly stronger than the reflected signal from the target and may present a problem for the receiver to detect the weak reflected signals in the presence of strong interfering transmissions from the other radar sources. As such, a UE 120 transmitting the radar waveform may fail to identify one or more nearby targets (e.g., based on the interference from direct radar signals transmitted by the target).

Figure 6A:
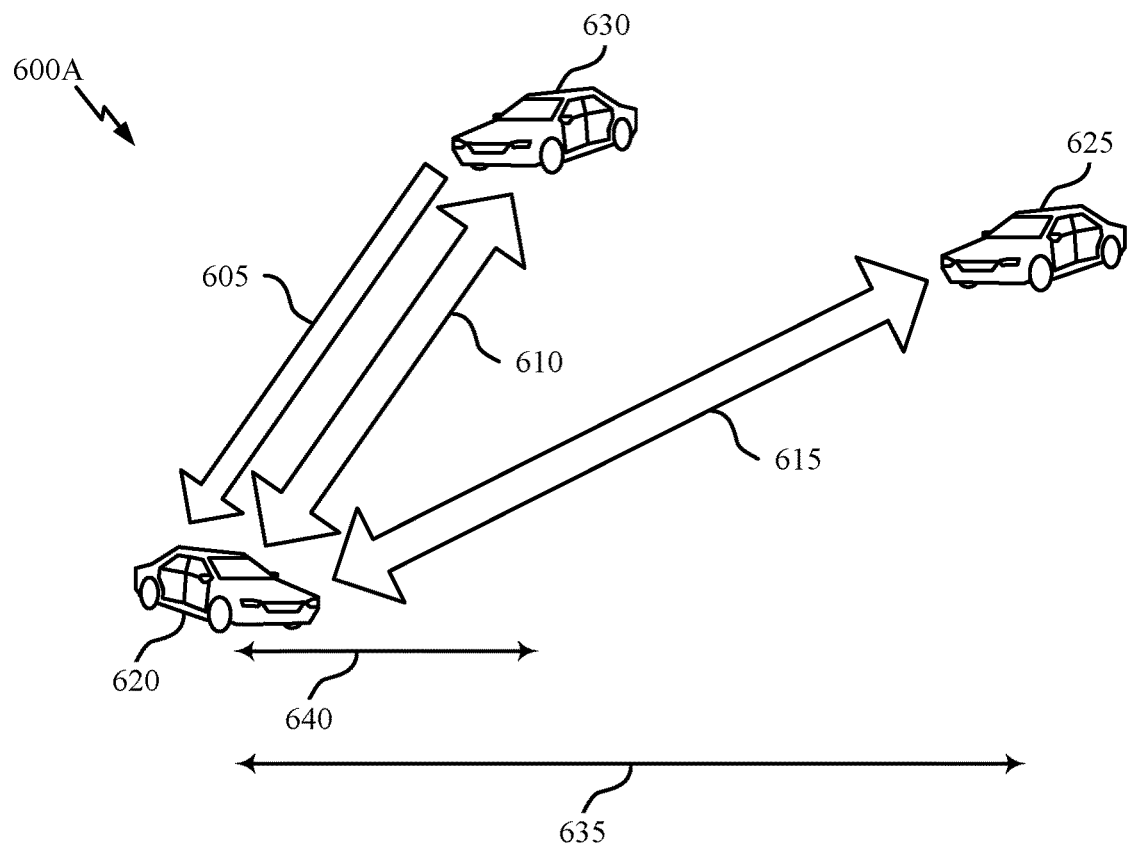
FIG. 6A illustrates an example wireless communications system in accordance with aspects of the present disclosure.

FIG. 6A illustrates an example wireless communications system 600A in accordance with aspects of the present disclosure. The wireless communications system 600A may include a vehicle 620 that emits radar, which may be moving from left to right. This vehicle 620 may be an example of a UE 120 as described with reference to FIGS. 1 through 5. The vehicle 620 may encounter other UEs 120 (e.g., vehicles 625 and 630), which may be static or moving (e.g., from right to left). Both vehicles 625 and 630 may reflect back desired signals 610 and 615, respectively (e.g., based on the radar emitted by the vehicle 620). The vehicle 630 closest to the vehicle 620 may also transmit radar 605 or another type of signal which may act as interference to the vehicle 620. If the vehicle 630 transmits a radar waveform, the vehicle 620 may not be able to distinguish the interference caused by the radar waveform from a reflected signal indicating a nearby target (e.g., a nearby UE 120, vehicle, structure, interference source, etc., such as vehicle 630).

Figure 6B:
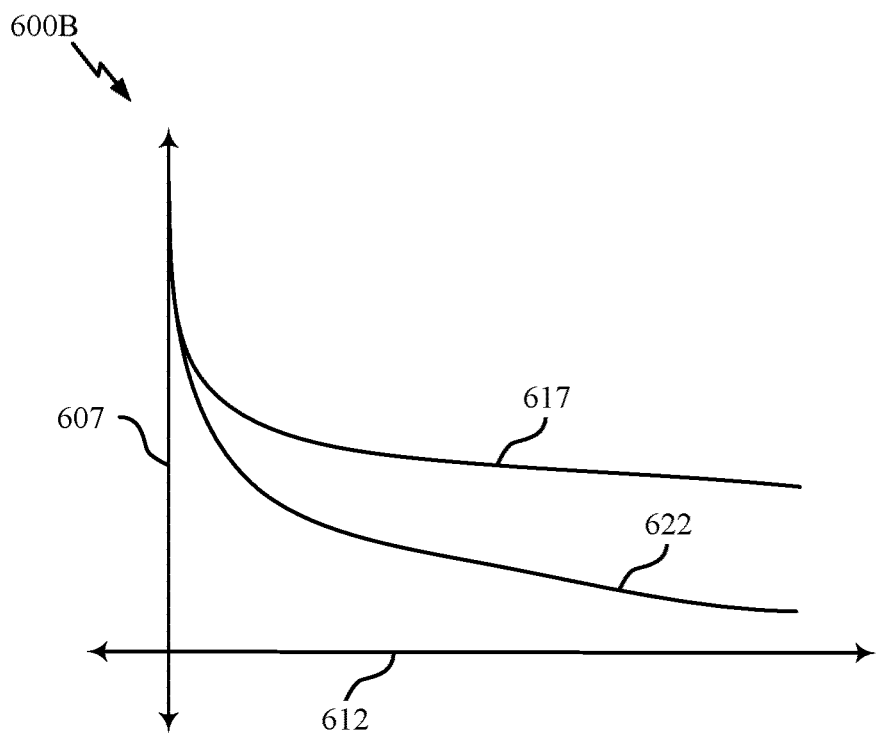
FIG. 6B illustrates an example graph showing received power of direct and reflected signals over distance in accordance with aspects of the present disclosure.

FIG. 6B illustrates an example graph 600B showing received power of direct and reflected signals over distance in accordance with aspects of the present disclosure. The graph 600B may illustrate the problem with interference from direct signals, in that interference due to a direct transmission 617 (e.g., from a target) is much stronger than the reflected signal 622 from the target. Axis 607 may represent a range of received power values (in dBm) for the signals and axis 612 may represent distances from the source (e.g., vehicle 620 emitting the radar) to the target (e.g., vehicle 630). Interference may appear as a ghost target at half the distance (e.g., plus a time offset) from the actual target and with a high power. With reflected signals from targets, the desired signals may have relatively low signal to interference ratios (SIRs) due to the near-far effect and the direct transmission 617 being received at a much stronger power than the reflected (desired) signal from the target 622, or both. That is, the interference may have a relatively high power compared to the desired signals reflected from the target.

The graph 600B shows the received signal power from a reflected (desired) path based on a device (e.g., due to a radar transmission by a first source device) and a direct (interfering) signal from a second device, assuming the same transmit power at both radar sources. The reflected signal may decay by a factor of approximately $1/R^4$, where R is the distance from the vehicle 630 reflecting the radar and the direct, interference signal may decay by a factor of $1/R^2$, where R is the distance from the vehicle 630 transmitting the direct, interference radar signal. Thus, based on the example illustrated in FIGS. 6A and 6B, the reflected signal 622 from a desired target 625 at a distance 635 away (e.g., one-hundred and fifty (150) meters (m) away from the source vehicle 620) may be weaker than a direct interfering signal from a nearby source 630 at a distance 640 away (e.g., 10 m) and may present a challenging environment for target detection. Note that, in some scenarios, some spatial rejection is possible to mitigate the near-far effect and the spatial rejection may depend on the geometry (e.g., location of desired radar source, target, interfering radar source, etc.) and spatial response of the radar receiver antennas. However, such a spatial rejection may not always occur. For example, cases where the three vehicles in FIG. 6A are on (or close to) a straight line and thereby have no (or a small) angular difference between the two radio paths (desired radar to the target vs. desired radar to the interfering radar) may not always include spatial rejection.

The present method, apparatuses, and non-transitory processor-readable storage medium may enable the selection of waveform parameters for multi-radar coexistence. In one aspect, an FMCW waveform is used. In some cases, including for vehicles, the FMCW may be the most commonly used waveform. However, the present operations may apply to other radar waveforms as well. With FMCW, the frequency of the waveform may be varied linearly with time as a sawtooth or triangle shaped function (e.g., as described with reference to FIG. 8). A vehicle 620 transmitting the radar waveform may receive and process reflected signals from one or more targets and detect the range and Doppler of each target based on the difference in the received and the transmitted frequencies.

In FMCW operation, the radar waveforms may include a set of "chirps," where each chirp has a specific chirp duration. A modulating signal may vary the chirp's instantaneous frequency linearly over a fixed period of time (e.g., sweep time $T_C$). The transmitted signal (e.g., the emitted radar waveform) may interact with the target and reflect back to a receive antenna. The frequency difference, $\Delta f$, between the transmitted signal and the received signal may increase with the delay of receiving the reflected signal. The distance of the target from the radar is the range, and the delay, $\tau$, may be linearly proportional to the range between the target and the source and may be equal to the round trip travel time. The echo from the target may be mixed with the transmitted signal and down-converted to produce a beat signal which may be linearly proportional to the range between the target and the source of the signal after demodulation.

Figure 7A:
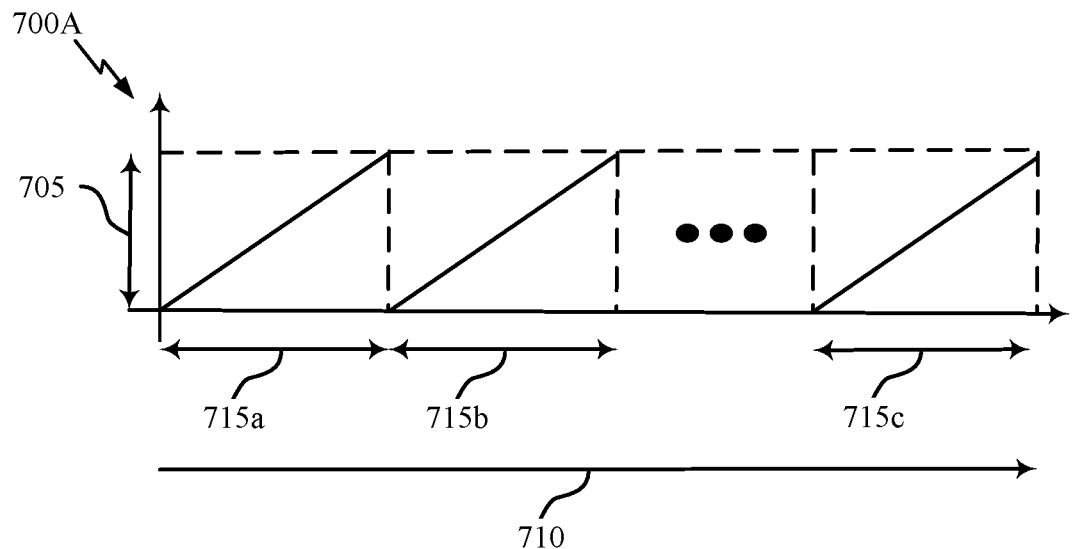
FIGS. 7A and 7B illustrate frequency-time plots of a frequency modulated continuous wave (FMCW) with different parameters in accordance with aspects of the present disclosure.
Figure 7B:
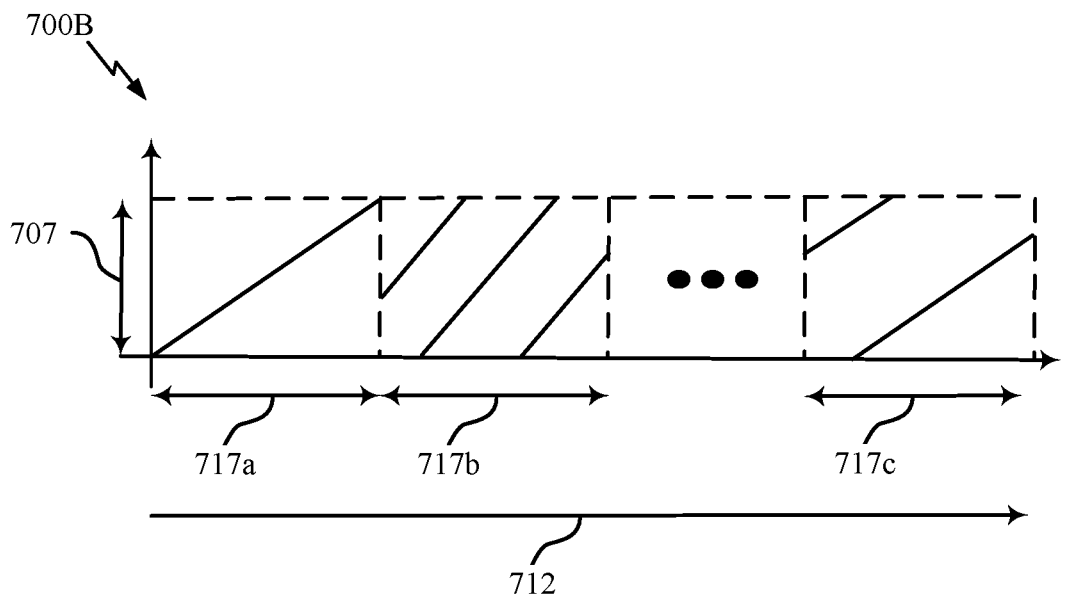

FIGS. 7A and 7B illustrate frequency-time plots 700 of an FMCW with different parameters in accordance with aspects of the present disclosure. In the frequency-time plots 700A and 700B, B may represent the frequency range 705 or 707 for the FMCW waveform and $T_C$ may represent the duration of a chirp 715 or 717 (shown in time 710 and 712). The frequency of the wave sweeps across the entire bandwidth part from zero (0) to B (where 0 and B illustrate the range of the frequency, and the actual frequency values may be any values in the bandwidth). Typically, the frequency of the radar may sweep approximately 1 or 2 GHz. The chirp period may typically span between 10 and two hundred (200) micro-seconds (μs).

FIG. 7A may illustrate unvaried waveform parameters for an FMCW waveform. In the example of FIG. 7A and frequency-time plot 700A, 705 may represent B, 710 may represent a time including $N_C$ chirps, and each of 715 may represent a chirp duration $T_C$. FIG. 7B may illustrate variations in the slope β and/or the frequency offset $f_0$ parameters (e.g., where the variations may be performed based on radar information for nearby vehicles in order to support interference shaping, interference suppression, or both). In the example of FIG. 7B and frequency-time plot 700B, 707 may represent B, 712 may represent a time including $N_C$ chirps, and each of 717 may represent a chirp duration $T_C$ (or may represent a reference chirp duration $T_C$). In some cases, multiple chirps may be transmitted back to back.

At the receiver, multiple chirps may be processed (e.g., in sequence). In some cases (e.g., as illustrated), the chirp duration $T_C$ may stay the same for a radar waveform, and the frequency of the wave may sweep through the frequency range B any number of times within the reference chirp duration. In other cases, the chirp duration $T_C$ may correspond to a single frequency sweep through the frequency range B, and, accordingly, the chirp duration $T_C$ may vary for a set of chirps depending on the slope, β. For a "fast" chirp, the $T_C$ duration is short, and for a "slow" chirp, the $T_C$ duration is long. In some cases, a UE 120 (e.g., a vehicle) may select waveform parameters for transmission of the radar waveform, where the waveform parameters are applied to frequency-time plot 700A. The UE may vary these selected waveform parameters for at least one chirp, resulting in selected waveform parameters corresponding to frequency-time plot 700B.

The system may be configured to determine how to vary the chirp parameters. Two parameters which define the waveform used over the chirp duration $T_C$ may be the slope, β, and the frequency offset, $f_0$, where the slope is defined as $\beta = B/T_C$ for a specific chirp. For example, an FMCW radar system can be designed to sweep the frequency linearly over 1 GHz and 50 μs, yielding a slope $\beta = 1$ GHz/50 μs, and the frequency offset $f_0$ can be set to any value between 0 and 1 GHz. The frequency offset $f_0$ may correspond to the initial frequency value at the start of the chirp duration $T_C$. The frequency offset $f_0$ may be an absolute frequency value or a relative frequency value within a bandwidth or bandwidth part. In FIG. 7A, the slope and frequency offset may be kept constant over multiple chirps. That is, B 705 may be the same for each chirp of a set of chirps and $T_C$ 715a, 715b, and 715c may be the same for the set of chirps, resulting in a constant slope β for the set of chirps. Additionally, the frequency offset, $f_0$, may be the same for each chirp of the set of chirps.

In FIG. 7B, instead of keeping the parameters constant, a UE 120 (e.g., a vehicle in a V2X system, a device in a D2D system, etc.) may vary the parameters for one or more chirps. For example, the slope or frequency offset for one or more chirps (e.g., spanning 717a, 717b, and 717c) may be different from the slope or frequency offset for one or more other chirps within a same waveform. Furthermore, if a pattern is selected to vary the slope and the frequency offset for at least one chirp (e.g., where the pattern may define parameters per chirp), interference from other radar emissions may be suppressed or shaped (e.g., offset) based on the varied waveform parameters. In some cases, based on the way parameters are varied between different radar sources, two effects may occur. In a first aspect, interference between the radar sources may be suppressed. Additionally or alternatively, in a second aspect, interference may be shaped. Shaping the interference may involve time delaying and/or frequency shifting the interference beyond what may be detected by the receiver (or identified as significant by the receiver). By specifically selecting the parameters of the waveforms, the waveforms of coexistent radar may be normalized so the waveforms do not mutually interfere in a manner that affects the target detection performance.

Figure 8:
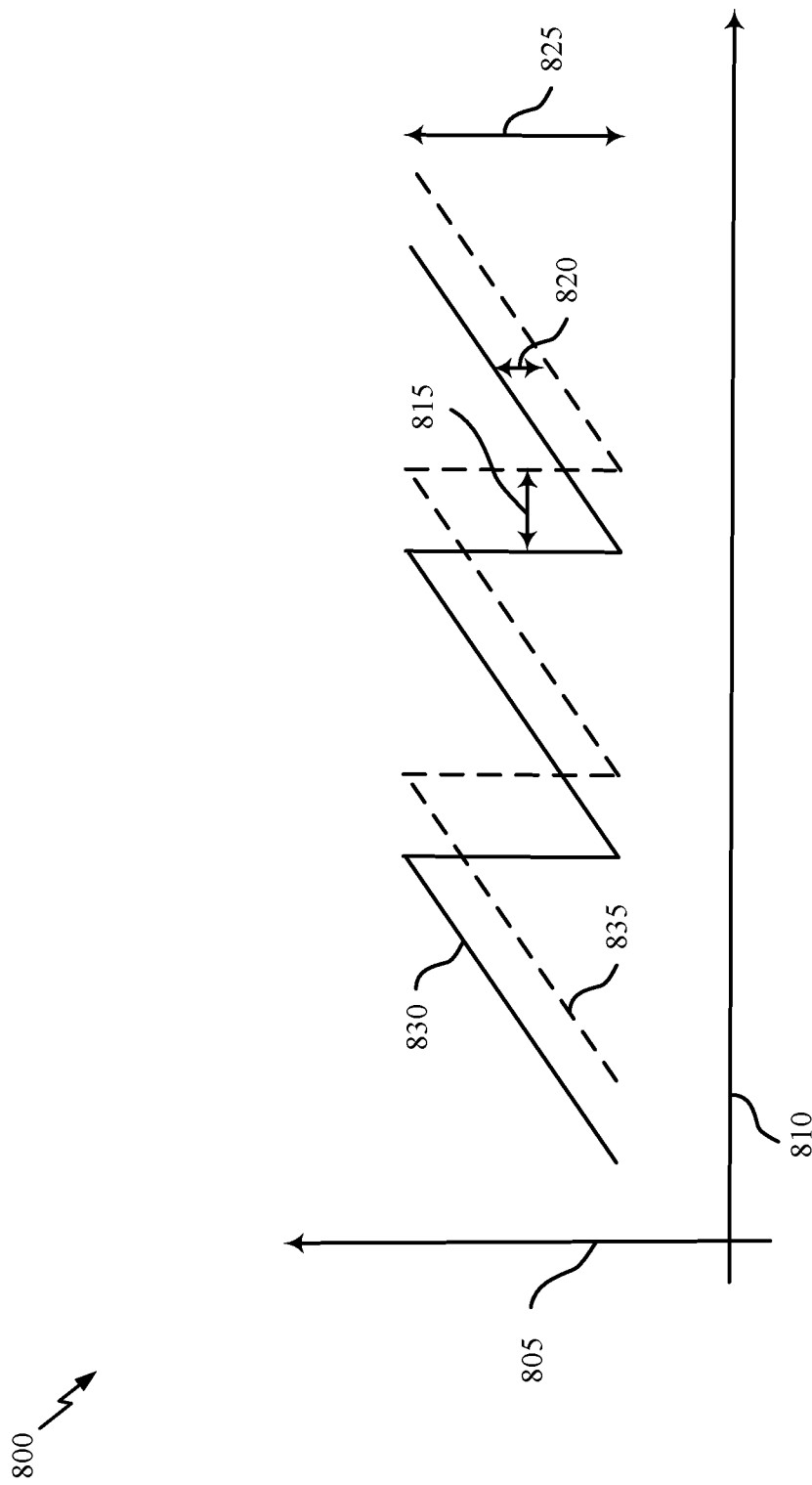
FIG. 8 illustrates an FMCW system with received and transmitted ramp waveforms with sawtooth chirp modulation in accordance with aspects of the present disclosure.

FIG. 8 illustrates an FMCW system 800 with received and transmitted ramp waveforms with sawtooth chirp modulation in accordance with aspects of the present disclosure. Axis 805 may represent frequency, and axis 810 may represent time. Time interval 815 may represent the delay, τ. Frequency interval 820 may represent the frequency difference, Δf, between the transmitted signal (represented by 830) and the received signal (represented by 835). Frequency interval 825 may be a frequency range, B, for the chirps.

The parameters of the FMCW waveform may vary for one or more chirps (e.g., for each chirp, for a subset of chirps, for at least one chirp, etc.) for interference randomization. Interference suppression and interference shaping may be made possible based on UEs 120 (e.g., vehicles) selecting patterns based on which parameters are varied across users.

In one aspect, certain choices of parameters of the FMCW waveform can lead to the radar waveform resembling a Zadoff-Chu sequence, which exhibits correlation properties (e.g., autocorrelation, cross-correlation, etc.) which may help with interference suppression.

As discussed herein, two waveform parameters that may be varied from chirp to chirp are the slope β and the frequency offset $f_0$. In the equations described herein, the slope and frequency offset of a chirp may be determined using two parameters (u and q) for a given chirp.

In the equations described herein, the slope for chirp m may be determined as $$\beta^{(m)} = u^{(m)} * \frac{B}{T_c}$$

and the frequency offset may be determined as $$f_0^{(m)} = u^{(m)} * \frac{(1 + 2q^{(m)})}{T_c},$$

where m=1, 2, 3, . . . is the chirp index, $T_C$ is the period of the chirp, B is the frequency range, and ($u^{(m)}$, $q^{(m)}$) are the two parameters for the $m^{th}$ chirp that may determine the FMCW waveform such that it resembles a Zadoff-Chu sequence. Using these equations, the parameters ($u^{(m)}$, $q^{(m)}$) may be chosen at a UE 120 such that interference between coexistent radar will be suppressed by utilizing the correlation properties of Zadoff-Chu waveforms. An equation for a set of chirps may be:

$$(\beta^{(m)}, f_0^{(m)}) = \left( u^{(m)} \frac{B}{T_c}, u^{(m)} \frac{(1 + 2q^{(m)})}{T_c} \right) \quad (1)$$

where $T_C$ is the period of the chirp, B is the frequency range, $\beta^{(m)}$ is the slope and $f_0^{(m)}$ is the frequency offset for the $m^{th}$ chirp, and ($u^{(m)}$, $q^{(m)}$) are the two parameters for the $m^{th}$ chirp that determine the FMCW waveform. The Zadoff-Chu sequence is an example of a mathematical sequence. It gives rise to an electromagnetic signal of constant amplitude when it is applied to radio signals, whereby cyclically shifted versions of the sequence imposed on a signal result in zero correlation with one another at the receiver. The "root sequence" is a generated Zadoff-Chu sequence that has not been shifted. These sequences exhibit a property that cyclically shifted versions of itself are orthogonal to one another, provided that each cyclic shift, when viewed within the time domain of the signal, is greater than the combined multi-path delay-spread and propagation delay of that signal between the transmitter and receiver.

In some cases, $u_i^{(m)} \neq u_j^{(m)}$, where $(\bullet)^{(m)}$ is the $m^{th}$ chirp and i and j are two radar transmitters (e.g., for two UEs 120 within close proximity of each other). In these cases, the Zadoff-Chu sequences for these radar transmitters may have cross-correlation, effectively raising the noise floor for interference. Here, two UEs 120 (e.g., corresponding to radar transmitters i and j) use different slopes, $u_i^{(m)}$ and $u_j^{(m)}$, on the $m^{th}$ chirp (e.g., on chirps overlapping in the time domain). This may lead to a cross-correlation of the corresponding sequences for i and j, which may be limited by the length of the Zadoff-Chu sequence. The cross-correlation may result in interference suppression amongst the two Zadoff-Chu sequences. The correlation amongst the two Zadoff-Chu sequences may raise the noise floor (e.g., meaning the two sequences are not orthogonal). In these cases, the cross-correlation may be relatively small (but non-zero), meaning the interference may be spread with a low energy appearing as noise. This interference can be suppressed by the length of the Zadoff-Chu sequences. Accordingly, the interference may not appear as a ghost target but as suppressed noise (e.g., due to the interference suppression) which raises the noise floor.

A UE 120 (e.g., a vehicle) may shape interference by setting frequency offsets such that ghost targets or interference peaks appear beyond a range of interest. For example, if $u_i^{(m)} = u_j^{(m)}$ (e.g., the slope of the waveform for transmitter i for the $m^{th}$ chirp is equal to the slope of the waveform for transmitter j for the $m^{th}$ chirp), the peak interference may be shifted relative to ($q_i^{(m)} - q_j^{(m)}$) (e.g., the frequency offset parameter of the transmitter, i, for the $m^{th}$ chirp minus the frequency offset parameter of the transmitter, j, for the $m^{th}$ chirp). In one aspect, the peak interference can be shifted to be greater than the range of interest. For example, for a range target (e.g., a range of interest) of 150 m, bandwidth of 1 GHz, chirp duration $T_C$ of 10 μs, slope parameter $u_i^{(m)} = u_j^{(m)} = 1$, and a receiver with sampling rate of 1 giga samples per second (Gsps), ($q_i^{(m)} - q_j^{(m)}$) can be set between [1000, 9000] such that mutual interference will appear at a distance greater than 150 m which may be beyond the range expected from any target reflected signals by design. So if the slopes $u^{(m)}$ for radar transmitters i and j are the same slope size, the frequency offsets $q_i^{(m)}$ and $q_j^{(m)}$ can be selected so the peak of the interference from one transmitter on the target signal of the other transmitter can be shifted beyond a pre-defined or dynamically determined range of interest. In one aspect, even if the radar transmitters are next to each other (e.g., within very close proximity), the energy from each radar transmitter will appear far from the other transmitter and not as interference within the range of interest based on the interference shaping techniques described herein.

In a phase-coded FMCW system, avoiding coherent addition of chirps with the same parameters helps suppress interference. For example, 90% of the chirps in a set of waveforms may be orthogonal, where the parameters for each chirp are selected such that interference between chirps of different waveforms are suppressed or shaped. However, 10% of the chirps may still have the same parameters across waveforms and therefore may add up coherently. A phase code can be added over a waveform to suppress or shape interference, such that each chirp of a set of chirps (e.g., every chirp or almost every chirp in a waveform) has an associated phase, where the phase may vary from one chirp to another. The following equation supports applying a phase code (e.g., a Zadoff-Chu sequence) to a waveform $x_{FMCW}$ [m, n]:

$$x[m, n] = x_{FMCW}[m, n] \cdot e^{-j\pi \bar{u} \frac{(m+1+2\bar{q})m}{N}} \quad (2)$$

In this case, m is the chirp index, with m=0, 1, ..., N, N is the maximum prime integer (e.g., the length of the Zadoff-Chu sequence) that is less than or equal to the number of chirps, $N_C$, and n is the sample index within the $m^{th}$ chirp. The phase modulation applied may be based on the Zadoff-Chu sequence $$\left(e.g., \exp\left(-j\pi\bar{u}\frac{(m+1+2\bar{q})m}{N}\right)\right)$$

and determined by a choice of the parameters ($\bar{u}$, $\bar{q}$). By adding the phase code, there are, in effect, two nested Zadoff-Chu sequences. First, for the original FMCW waveform selected by the UE 120, every chirp resembles a Zadoff-Chu sequence with a certain choice of parameters. Second, the UE 120 implements a Zadoff-Chu sequence representing phase modulation for the waveform (e.g., on top of the FMCW Zadoff-Chu sequence).

The processing on the receiver end may also change to coherently combine desired signals. For example, a receiver may use equalization, resampling, or some combination of these or other techniques for coherently combining desired signals on the receiver side.

From the equations described herein, the following set of parameters may be used to vary an FMCW waveform for a set of chirps (e.g., every chirp) for interference randomization:

$$\{\bar{u}_i, \bar{q}_i, c_i := (u_i^{(m)}, q_i^{(m)}), m=1, \ldots, N_c\}, \quad (3)$$

where i is the transmitter index, m is the chirp index, $N_C$ is the total number of chirps over which randomization is performed, and ($u_i^{(m)}$, $q_i^{(m)}$) determine the slope and frequency offset of the FMCW waveform in the $m^{th}$ chirp. Additionally, if a phase code is added, the pattern of parameters may include ($\bar{u}_i$, $\bar{q}_i$,), which may control the phase-modulation applied across $N_C$ chirps. A UE 120 may select a codeword from a codebook, where the codeword may indicate the parameters to use for the waveform. Multiple users may use a same codebook for codebook-based selection of the FMCW parameters. In some cases, the UE 120 may select ($\bar{u}_i$, $\bar{q}_i$,) (e.g., randomly, pseudo-randomly, based on some procedure, etc.) with a uniform distribution within a range.

The UE 120 may additionally or alternatively select $c_i := (u_i^{(m)}, q_i^{(m)})$, m=1, ..., $N_c$ such that a "distance" among codewords (e.g., codewords selected by nearby UEs 120) is maximized. The "distance" measurement may be set to a maximum distance if the slopes for chirps are different, while the "distance" measurement may be set proportional to ($q_i - q_k$) if the slopes are the same (e.g., where the distance may top out at the maximum delay if $q_i - q_k$ > max delay). For example, the parameters for the codeword used by transmitter i may be chosen such that interference between radar waveforms in a system is suppressed or shaped or both, where $c_i$ is the set of parameters that control the slope and frequency offset of the $m^{th}$ chirp, $u_i^{(m)}$ is the slope parameter for the $m^{th}$ chirp, $q_i^{(m)}$ is the frequency offset parameter for the $m^{th}$ chirp, m is the chirp index, and $N_C$ is the total number of chirps over which the suppression of interference is performed.

When UEs 120 (e.g., vehicles in a V2X system, devices in a D2D system, etc.) are in a congested area (e.g., when a vehicle is in traffic), these parameters can be chosen from a codebook that includes a set of allowed patterns of parameter values (e.g., codewords). The codebook can be designed to yield low mutual interference among any two codewords or among any two codewords within a subset of codewords. Thus, codebook-based selection of waveform parameters can be performed by multiple UEs 120 using a same codebook to support low mutual interference of radar signals by the UEs 120 in the system.

Radar target detection may involve a UE 120 transmitting a radar waveform including $N_C$ chirps, where each chirp has a duration $T_C$ (which may be the same for all chirps or different for one or more chirps in the waveform). In one aspect, every chirp uses an FMCW waveform. In another aspect, every chirp uses a phase-coded FMCW waveform. In another aspect, at least one chirp uses an FMCW waveform or a phase-coded FMCW waveform. To suppress interference, the waveform and/or waveform parameters may be varied for at least a subset of the $N_C$ chirps. In one aspect, the parameters being varied are determined from a set of possible patterns (e.g., codewords), where a pattern may be referred to as a codeword and a set of patterns may be referred to as a codebook. In one aspect, the UE may broadcast its codeword (or an indication of its codeword) over a side-channel or side-communication channel. A UE 120 receiving radar waveforms may coherently combine desired signals. For example, a receiver may use equalization, resampling, or some combination of these or other techniques for coherently combining desired signals on the receiver side.

For the case of a pattern of parameters being used over chirps, a codeword may be chosen from a set of codewords each having a pattern of parameters. As stated herein, parameters may be selected by choosing a codeword from a codebook where the codebook can be designed to yield low mutual interference among UEs 120 (e.g., radar sources) in the system. If the pattern of parameters (e.g., a codeword) used by another vehicle with transmitter j is known by the vehicle with transmitter i, then the vehicle with transmitter i may select a codeword from the codebook in order to produce the least mutual interference with the waveform corresponding to the pattern of parameters used by the vehicle with transmitter j. In one aspect, the first vehicle with transmitter i may determine the set of patterns (e.g., one or more codewords) being used by other vehicles (e.g., including vehicle j) in proximity to the first vehicle (e.g., within a given geographic range, transmitting with a received signal power above a given threshold, etc.) and may select a codeword for transmission that results in the least mutual interference between the first vehicle and the other vehicles (e.g., including vehicle j). For example, the codeword may be selected such that the first vehicle transmits a radar waveform (e.g., from transmitter i) that mitigates interference (e.g., the mutual interference is minimized or below a static or dynamic interference threshold) with radar waveforms transmitted by other nearby UEs.

The UEs 120 in a system may support multi-radar coexistence by determining the radar waveforms used by the other UEs 120 in the system (e.g., within a certain range of interest. For example, a UE 120 may detect interference from at least one interference source (e.g., another UE 120 in the system transmitting a radar waveform). The interference can be detected by the UE 120 by observing (i.e., monitoring for and processing) a received signal and/or signal energy. Based on the radar signal or signal energy, the UE 120 may determine a pattern of parameters (e.g., a codeword) corresponding to the signal or signal energy. For example, the UE 120 may process received interference over the potential patterns of parameters in the codewords. In some cases, the UE 120 may select a codeword for its own radar waveform that is closest to being orthogonal (e.g., leads to the minimum mutual interference) to the detected codewords being used by other nearby UEs 120 (e.g., within a certain proximity).

In one aspect, the UE 120 may identify the codewords used by nearby UEs 120 (e.g., UEs within a range of interest that may interfere with radar signaling by the UE 120). This identification may be based on detecting interference, receiving indicators of the used codewords (e.g., over sidelink channel signaling), or a combination thereof. The UE 120 may select a codeword from a codebook that is different from the identified codewords. In some cases, the UE 120 may perform a random (e.g., pseudo-random) selection process to determine the codeword from a subset of codewords in the codebook that does not include any of the codewords used by the nearby UEs 120. In other cases, the UE 120 may select a codeword from the codebook based on an estimated mutual interference with the codewords used by the nearby UEs 120. For example, the UE 120 may select the codeword resulting in the minimum mutual interference or may select a codeword resulting in a mutual interference below a static or dynamic interference threshold. In a second aspect, the UE 120 may select the codeword for radar signaling based on observed or estimated parameters of detected interference (e.g., without identifying one or more specific codewords corresponding to the interference). In a third aspect, the UE 120 may implement some combination of detected interference and identified codewords to select a codeword that mitigates interference between radar waveforms in the system. Using the parameters in the selected codeword, the UE 120 may transmit a radar waveform (e.g., for target detection). As the waveform parameters are selected based on detected interference, waveform parameters used by nearby UEs 120, or a combination thereof, the waveform parameters may suppress or shape interference from nearby interference sources.

In some cases, the UE 120 may periodically measure interference on a channel and periodically select updated waveform parameters (e.g., an updated codeword) for transmitting a radar waveform based on the periodic measurements. In this way, if the environment around the UE 120 changes, the UE 120 may select different waveform parameters to mitigate radar interference. The periodicity of measurements and/or updating the codeword selection may be based on a configuration of the UE 120 or one or more operations or properties of the UE 120. For example, if the UE 120 (e.g., a vehicle) is traveling at a high speed (e.g., above some speed threshold) or is in heavy traffic, the UE 120 may increase the frequency that it measures interference and determines waveform parameters (e.g., due to rapidly changing conditions). Additionally or alternatively, a base station 110 or other UE 120 may configure the UE 120 with a measurement periodicity.

In one aspect, a codeword contains a subset of the values for the parameters found in the following codeword parameter set:

$$\{\Phi_i^{(m)}, c_i := (\beta_i^{(m)}, f_{0,i}^{(m)}), m=1, \ldots, N_c\}, \quad (4)$$

where $c_i$ is the set of parameters for the $i^{th}$ codeword (or, correspondingly, for the codeword of the $i^{th}$ receiver) that determines the slope and frequency offset of the FMCW waveform transmitted in chirp m, $\beta_i^{(m)}$ is the slope of the FMCW waveform of the $i^{th}$ codeword for the $m^{th}$ chirp, and $f_{0,i}^{(m)}$ is the frequency offset of the FMCW waveform of the $i^{th}$ codeword for the $m^{th}$ chirp. In some cases (e.g., for phase-coded FMCW waveforms), the codeword may include a parameter, $\Phi_i^{(m)}$, that indicates the phase modulation applied for the $i^{th}$ codeword to the $m^{th}$ chirp. In the above equation, m is the chirp index and $N_c$ is the total number of chirps over which the waveform parameters are varied.

Figure 9:
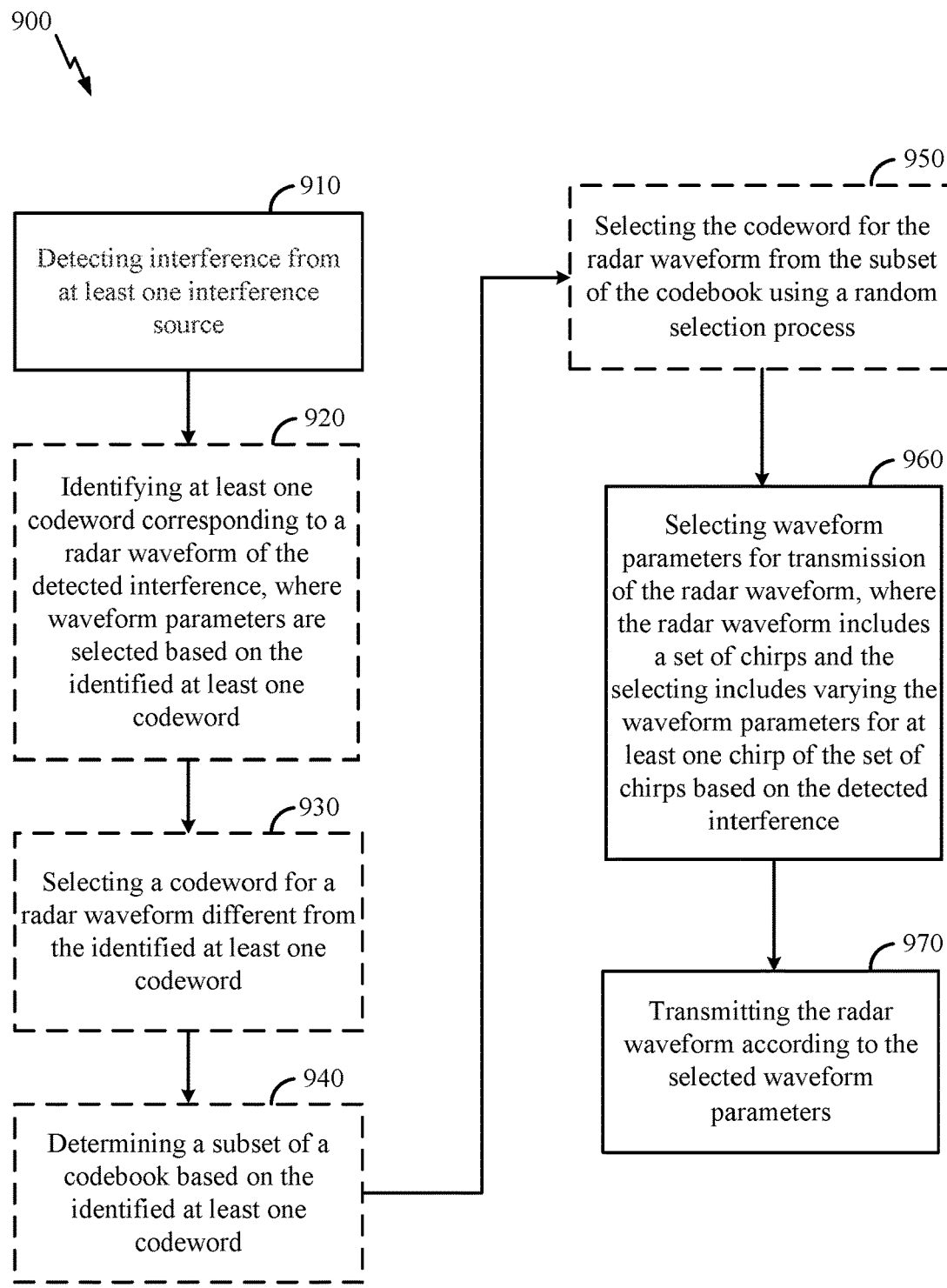
FIG. 9 is a flowchart illustrating a method for enabling the selection of FMCW waveform parameters for multi-radar coexistence in accordance with aspects of the present disclosure.

FIG. 9 is a flowchart illustrating a method 900 for enabling the selection of FMCW waveform parameters for multi-radar coexistence in accordance with aspects of the present disclosure. The operations of method 900 may be implemented by a UE 120 or its components or other wireless communications devices as described herein.

At 910, the UE 120 may detect interference from at least one interference source. This interference may be (or resemble) a radar waveform (e.g., from another UE 120 in the system).

In some cases, at 920, the UE 120 may identify at least one codeword corresponding to a radar waveform of the detected interference, where waveform parameters may be selected by the UE 120 based on the identified at least one codeword. In some of these cases, at 930, the UE 120 may select a codeword for a radar waveform different from the identified at least one codeword. For example, at 940, the UE 120 may determine a subset of a codebook based on the identified at least one codeword and, at 950, may select the codeword for the radar waveform from the subset of the codebook using a random selection process (e.g., removing the identified codeword(s) as possibilities and selecting the codeword from the remaining codewords in the codebook).

At 960, the UE 120 may select waveform parameters for transmission of a radar waveform, where the radar waveform includes a set of chirps and the selecting includes varying the waveform parameters for at least one chirp of the set of chirps based on the detected interference. The selected waveform parameters may be indicated by the selected codeword (e.g., selected at 930 or 950). At 970, the UE 120 may transmit the radar waveform according to the selected waveform parameters. The radar waveform may be an example of an FMCW waveform, and the UE 120 may use the radar waveform for target detection in the system. For example, the UE 120 may monitor for reflections of the radar waveform indicating targets in the system.

Figure 10:
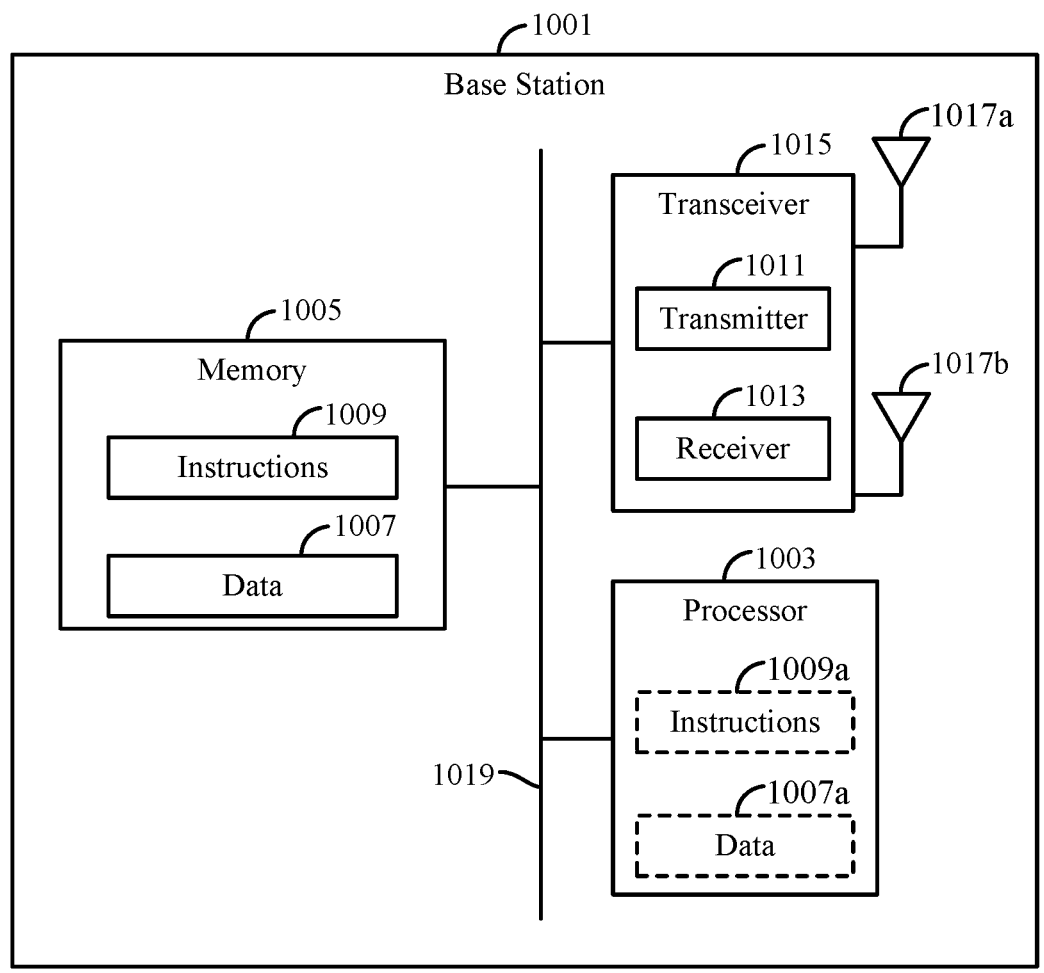
FIG. 10 illustrates certain components that may be included within a base station in accordance with aspects of the present disclosure.

FIG. 10 illustrates certain components that may be included within a base station in accordance with aspects of the present disclosure. The base station may be an example of a base station 1001 (e.g., a base station 110). The base station 1001 may be an access point, a NodeB, an evolved NodeB, etc. The base station 1001 includes a processor 1003. The processor 1003 may be a general purpose single-chip or multi-chip microprocessor (e.g., an advanced reduced instruction set computer (RISC) machine (ARM) microprocessor), a special purpose microprocessor (e.g., a digital signal processor (DSP)), a microcontroller, a programmable gate array, etc. The processor 1003 may be referred to as a central processing unit (CPU). Although just a single processor 1003 is shown in the base station 1001 of FIG. 10, an alternative configuration may include a combination of processors (e.g., an ARM and a DSP).

The base station 1001 also includes memory 1005. The memory 1005 may be any electronic component capable of storing electronic information. The memory 1005 may be embodied as random-access memory (RAM), read-only memory (ROM), magnetic disk storage media, optical storage media, flash memory devices in RAM, on-board memory included with the processor, erasable programmable ROM (EPROM), electrical erasable programmable ROM (EEPROM), registers, and so forth, including combinations thereof.

Data 1007 and instructions 1009 may be stored in the memory 1005. The instructions 1009 may be executable by the processor 1003 to implement the methods disclosed herein. Executing the instructions 1009 may involve the use of the data 1007 that is stored in the memory 1005. When the processor 1003 executes the instructions 1109, various portions of the instructions 1009a may be loaded onto the processor 1003, and various pieces of data 1007a may be loaded onto the processor 1003.

The base station 1001 may also include a transmitter 1011 and a receiver 1013 to allow for transmission and reception of signals to and from the wireless device 1001. The transmitter 1011 and receiver 1013 may be collectively referred to as a transceiver 1015. Multiple antennas 1017 (e.g., antennas 1017a and 1017b) may be electrically coupled to the transceiver 1015. The base station 1001 may also include multiple transmitters, multiple receivers, and/or multiple transceivers (not shown).

The various components of the base station 1001 may be coupled together by one or more buses, which may include a power bus, a control signal bus, a status signal bus, a data bus, etc. For the sake of clarity, the various buses are illustrated in FIG. 10 as a bus system 1019. Although FIGS. 6 through 9 are discussed herein with reference to a UE, it should be understood that a base station, such as base station 1001, may perform the corresponding transmitting that is and monitored and received by the UE as well as the receiving of the information indicated by the UE discussed in FIGS. 6 through 9. These operations may be implemented in hardware or software executed by a processor like the processor 1003 described with reference to FIG. 10. For example, the functions described herein in the flowchart of FIG. 9 may be implemented in hardware or software executed by a processor like the processor 1003 described with reference to FIG. 10.

Figure 11:
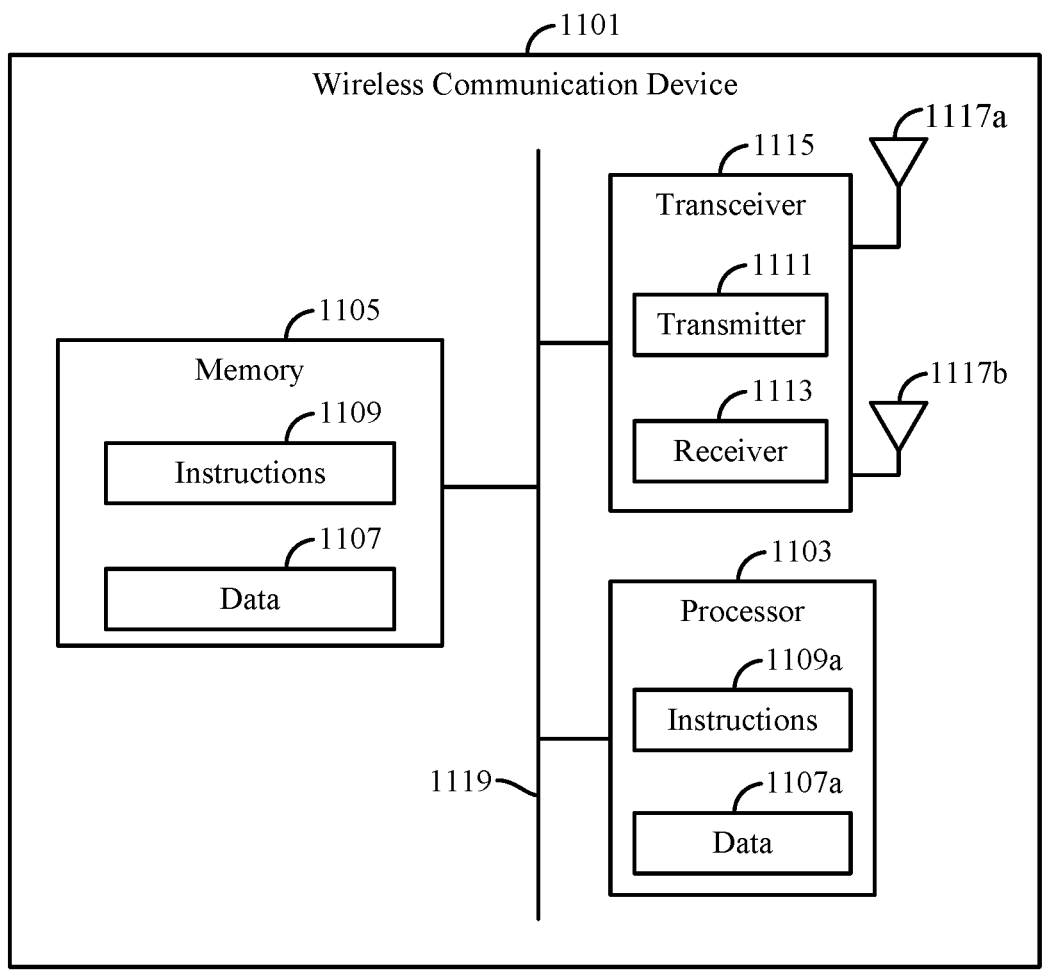
FIG. 11 illustrates certain components that may be included within a wireless communication device in accordance with aspects of the present disclosure.

FIG. 11 illustrates certain components that may be included within a wireless communication device in accordance with aspects of the present disclosure. The wireless communication device may be an example of a wireless communication device 1101 (e.g., a UE 120). The wireless communication device 1101 may be an access terminal, a mobile station, a UE, etc. The wireless communication device 1101 includes a processor 1103. The processor 1103 may be a general-purpose single-chip or multi-chip microprocessor (e.g., an ARM), a special purpose microprocessor (e.g., a DSP), a microcontroller, a programmable gate array, etc. The processor 1103 may be referred to as a CPU. Although just a single processor 1103 is shown in the wireless communication device 1101 of FIG. 11, in an alternative configuration, a combination of processors (e.g., an ARM and a DSP) could be used.

The wireless communication device 1101 also includes memory 1105. The memory 1105 may be any electronic component capable of storing electronic information. The memory 1105 may be embodied as RAM, ROM, magnetic disk storage media, optical storage media, flash memory devices in RAM, on-board memory included with the processor, EPROM, EEPROM, registers, and so forth, including combinations thereof.

Data 1107 and instructions 1109 may be stored in the memory 1105. The instructions 1109 may be executable by the processor 1103 to implement the methods disclosed herein. Executing the instructions 1109 may involve the use of the data 1107 that is stored in the memory 1105. When the processor 1103 executes the instructions 1109, various portions of the instructions 1109a may be loaded onto the processor 1103, and various pieces of data 1107a may be loaded onto the processor 1103.

The wireless communication device 1101 may also include a transmitter 1111 and a receiver 1113 to support transmission and reception of signals to and from the wireless communication device 1101. The transmitter 1111 and receiver 1113 may be collectively referred to as a transceiver 1115. Multiple antennas 1117 (e.g., antennas 1117a and 1117b) may be electrically coupled to the transceiver 1115. The wireless communication device 1101 may also include multiple transmitters, multiple receivers, and/or multiple transceivers (not shown).

The various components of the wireless communication device 1101 may be coupled together by one or more buses, which may include a power bus, a control signal bus, a status signal bus, a data bus, etc. For the sake of clarity, the various buses are illustrated in FIG. 11 as a bus system 1119. The wireless communication device 1101 may perform one or more of the operations described herein with reference to FIGS. 6 through 9.

It should be noted that these methods describe possible implementation, and that the operations and the steps may be rearranged or otherwise modified such that other implementations are possible. In some cases, aspects from two or more of the methods may be combined. For example, aspects of each of the methods may include steps or aspects of the other methods, or other steps or techniques described herein. Thus, aspects of the disclosure may provide for receiving on transmit resources or operations and transmitting on receive resources or operations. The functions described herein in the flowchart of FIG. 9 may be implemented in hardware or software executed by a processor like the processor 1103 described with reference to FIG. 11.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other aspects and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different PHY locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, EEPROM, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as code-division multiple access (CDMA), TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and evolved UTRA (E-UTRA) are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from the 3GPP. CDMA2000 and UMB are described in documents from an organization named "3rd Generation Partnership Project 2" (3GPP2). The techniques described herein may be used for the systems and radio technologies mentioned herein as well as other systems and radio technologies. The description herein, however, describes an LTE system for purposes of example, and LTE terminology is used in much of the description described herein, although the techniques are applicable beyond LTE applications.

In LTE/LTE-A networks, including networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an AP, a radio transceiver, a NodeB, eNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein may transmit bidirectional communications using FDD (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for receiving on transmit and transmitting on receive. It should be noted that these methods describe possible implementations, and that the operations and the steps may be rearranged or otherwise modified such that other implementations are possible. In some aspects, aspects from two or more of the methods may be combined.

The various illustrative blocks and modules described in connection with the disclosure herein may be implemented or performed with a general-purpose processor, a DSP, an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various aspects, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a second label that distinguishes among the similar components. If just the first reference label is used in the specification, the description is applicable to any one of the similar components having the same first reference label irrespective of the second reference label.

What is claimed is:

1. A method for radar signaling implemented by a user equipment (UE), comprising:
   detecting interference from at least one interference source, the detected interference comprising a first radar waveform defined by at least one codeword; and
   transmitting a second radar waveform according to a set of waveform parameters, wherein the second radar waveform comprises a plurality of chirps and the set of waveform parameters is varied for at least one chirp of the plurality of chirps based at least in part on the at least one codeword defining the first radar waveform of the detected interference.

2. The method of claim 1, further comprising:
   selecting a codeword for the second radar waveform different from the at least one codeword defining the first radar waveform, wherein the set of waveform parameters are based at least in part on the selected codeword for the second radar waveform.

3. The method of claim 2, wherein the selecting the codeword for the second radar waveform comprises:
   determining a subset of a codebook based at least in part on the at least one codeword defining the first radar waveform; and
   selecting the codeword for the second radar waveform from the subset of the codebook using a random selection process.

4. The method of claim 2, wherein the selecting the codeword for the second radar waveform comprises:
   determining first waveform parameters indicated by the at least one codeword defining the first radar waveform; and
   selecting the codeword for the second radar waveform based at least in part on a mutual interference for the set of waveform parameters indicated by the codeword for the second radar waveform and the first waveform parameters indicated by the at least one codeword defining the first radar waveform being below a mutual interference threshold.

5. The method of claim 1, wherein the detecting the interference comprises:
   periodically measuring interference on a channel; and
   periodically updating the set of waveform parameters for transmission of the second radar waveform based at least in part on the periodically measured interference.

6. The method of claim 1, wherein the second radar waveform comprises a frequency modulated continuous wave (FMCW) waveform.

7. The method of claim 6, wherein the set of waveform parameters comprises
   a slope and a frequency offset of the FMCW waveform corresponding to a Zadoff-Chu sequence.

8. The method of claim 1, further comprising:
   applying a phase modulation to the second radar waveform.

9. The method of claim 8, wherein the applying the phase modulation comprises:
   selecting the phase modulation for the second radar waveform such that the phase modulation is different from a second phase modulation for at least the first radar waveform of the detected interference.

10. The method of claim 1, wherein the set of waveform parameters comprises
    a slope for the at least one chirp of the plurality of chirps such that the slope is different from a second slope for at least the first radar waveform of the detected interference.

11. The method of claim 1, wherein the set of waveform parameters comprises
    a frequency offset for the at least one chirp of the plurality of chirps such that an interference peak of at least the first radar waveform of the detected interference appears beyond a range of interest.

12. An apparatus for radar signaling implemented by a user equipment (UE), comprising:
    a processor;
    memory coupled with the processor; and
    instructions stored in the memory and executable by the processor to cause the apparatus to:
      detect interference from at least one interference source, the detected interference comprising a first radar waveform defined by at least one codeword; and
      transmit a second radar waveform according to a set of waveform parameters, wherein the second radar waveform comprises a plurality of chirps and the set of waveform parameters is varied for at least one chirp of the plurality of chirps based at least in part on the at least one codeword defining the first radar waveform of the detected interference.

13. The apparatus of claim 12, wherein the instructions are further executable by the processor to cause the apparatus to select a codeword for the second radar waveform different from the at least one codeword defining the first radar waveform, wherein the set of waveform parameters are based at least in part on the selected codeword for the second radar waveform.

14. The apparatus of claim 13, wherein the instructions to select the codeword for the second radar waveform are further executable by the processor to cause the apparatus to:
    determine a subset of a codebook based at least in part on the at least one codeword defining the first radar waveform; and select the codeword for the second radar waveform from the subset of the codebook using a random selection process.

15. The apparatus of claim 13, wherein the instructions to select the codeword for the second radar waveform are further executable by the processor to cause the apparatus to:
determine first waveform parameters indicated by the at least one codeword defining the first radar waveform; and
select the codeword for the second radar waveform based at least in part on a mutual interference for the set of waveform parameters indicated by the codeword for the second radar waveform and the first waveform parameters indicated by the at least one codeword defining the first radar waveform being below a mutual interference threshold.

16. The apparatus of claim 12, wherein the instructions to detect the interference are further executable by the processor to cause the apparatus to:
periodically measure interference on a channel; and
periodically update the set of waveform parameters for transmission of the second radar waveform based at least in part on the periodically measured interference.

17. The apparatus of claim 12, wherein the second radar waveform comprises a frequency modulated continuous wave (FMCW) waveform.

18. The apparatus of claim 17, wherein the set of waveform parameters comprises a slope and a frequency offset of the FMCW waveform corresponding to a Zadoff-Chu sequence.

19. The apparatus of claim 12, wherein the instructions are further executable by the processor to cause the apparatus to apply a phase modulation to the second radar waveform.

20. The apparatus of claim 19, wherein the instructions to apply the phase modulation are further executable by the processor to cause the apparatus to select the phase modulation for the second radar waveform such that the phase modulation is different from a second phase modulation for at least the first radar waveform of the detected interference.

21. The apparatus of claim 12, wherein the set of waveform parameters comprises a slope for the at least one chirp of the plurality of chirps such that the slope is different from a second slope for at least the first radar waveform of the detected interference.

22. The apparatus of claim 12, wherein the set of waveform parameters comprises a frequency offset for the at least one chirp of the plurality of chirps such that an interference peak of at least the first radar waveform of the detected interference appears beyond a range of interest.

23. An apparatus for radar signaling implemented by a user equipment (UE), comprising:
means for detecting interference from at least one interference source, the detected interference comprising a first radar waveform defined by at least one codeword; and
means for transmitting a second radar waveform according to a set of waveform parameters, wherein the second radar waveform comprises a plurality of chirps and the set of waveform parameters is varied for at least one chirp of the plurality of chirps based at least in part on the at least one codeword defining the first radar waveform of the detected interference.

24. The apparatus of claim 23, further comprising:
means for selecting a codeword for the second radar waveform different from the at least one codeword defining the first radar waveform, wherein the set of waveform parameters are based at least in part on the selected codeword for the second radar waveform.

25. The apparatus of claim 24, wherein the means for selecting the codeword for the second radar waveform comprise:
means for determining a subset of a codebook based at least in part on the at least one codeword defining the first radar waveform; and
means for selecting the codeword for the second radar waveform from the subset of the codebook using a random selection process.

26. The apparatus of claim 24, wherein the means for selecting the codeword for the second radar waveform comprise:
means for determining first waveform parameters indicated by the at least one codeword defining the first radar waveform; and
means for selecting the codeword for the second radar waveform based at least in part on a mutual interference for the set of waveform parameters indicated by the codeword for the second radar waveform and the first waveform parameters indicated by the at least one codeword defining the first radar waveform being below a mutual interference threshold.

27. The apparatus of claim 23, wherein the means for detecting the interference comprise:
means for periodically measuring interference on a channel; and
means for periodically updating the set of waveform parameters for transmission of the second radar waveform based at least in part on the periodically measured interference.

28. The apparatus of claim 23, wherein the second radar waveform comprises a frequency modulated continuous wave (FMCW) waveform.

29. The apparatus of claim 28, wherein the set of waveform parameters comprises
a slope and a frequency offset of the FMCW waveform corresponding to a Zadoff-Chu sequence.

30. The apparatus of claim 23, further comprising:
means for applying a phase modulation to the second radar waveform.

31. The apparatus of claim 30, wherein the means for applying the phase modulation comprise:
means for selecting the phase modulation for the second radar waveform such that the phase modulation is different from a second phase modulation for at least the first radar waveform of the detected interference.

32. The apparatus of claim 23, wherein the set of waveform parameters comprises
a slope for the at least one chirp of the plurality of chirps such that the slope is different from a second slope for at least the first radar waveform of the detected interference.

33. The apparatus of claim 23, wherein the set of waveform parameters comprises
a frequency offset for the at least one chirp of the plurality of chirps such that an interference peak of at least the first radar waveform of the detected interference appears beyond a range of interest.

34. A non-transitory computer-readable medium storing code for radar signaling implemented by a user equipment (UE), the code comprising instructions executable by a processor to:
detect interference from at least one interference source, the detected interference comprising a first radar waveform defined by at least one codeword;

and
transmit a second radar waveform according to a set of waveform parameters, wherein the second radar waveform comprises a plurality of chirps and the set of waveform parameters is varied for at least one chirp of the plurality of chirps based at least in part on the at least one codeword defining the first radar waveform of the detected interference.

\* \* \* \* \*